(12) United States Patent
Kulkarni et al.

(10) Patent No.: US 10,587,714 B1
(45) Date of Patent: Mar. 10, 2020

(54) METHOD FOR AGGREGATING DISTRIBUTED DATA

(71) Applicant: Amazon Technologies, Inc., Reno, NV (US)

(72) Inventors: Harshad Vasant Kulkarni, Redmond, WA (US); Carlos Daniel Gasperi, Seattle, WA (US); Colin Watson, Seattle, WA (US); Sharjeel Sohail, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 14/206,669

(22) Filed: Mar. 12, 2014

(51) Int. Cl.
*G06F 15/16* (2006.01)
*H04L 29/08* (2006.01)
*H04L 29/12* (2006.01)

(52) U.S. Cl.
CPC .... *H04L 67/2804* (2013.01); *H04L 29/12009* (2013.01)

(58) Field of Classification Search
CPC .......................... H04L 67/16; H04L 29/12009
See application file for complete search history.

(56) References Cited

U.S. PATENT DOCUMENTS

| | | | | |
|---|---|---|---|---|
| 8,103,772 | B2 * | 1/2012 | Schreter | H04L 29/12292 709/223 |
| 8,701,103 | B1 * | 4/2014 | Hsu | G06F 8/65 717/171 |
| 9,129,014 | B2 * | 9/2015 | Tan | G06F 16/60 |
| 2002/0061011 | A1 | 5/2002 | Wan | |
| 2006/0004816 | A1 * | 1/2006 | Diewald | G06Q 30/02 |
| 2007/0055785 | A1 * | 3/2007 | Stevens | G06Q 20/32 709/229 |
| 2008/0317038 | A1 * | 12/2008 | Pasko | H04L 12/4641 370/395.5 |
| 2009/0204612 | A1 | 8/2009 | Keshavarz-Nia et al. | |
| 2011/0016376 | A1 * | 1/2011 | Hinson | G06F 16/957 715/205 |
| 2011/0246925 | A1 * | 10/2011 | Marchand | G06Q 10/06 715/772 |
| 2012/0094639 | A1 * | 4/2012 | Carlson | H04W 4/029 455/414.1 |
| 2012/0246336 | A1 | 9/2012 | Sathish | |
| 2013/0027227 | A1 * | 1/2013 | Nordstrom | G08G 1/202 340/990 |

(Continued)

*Primary Examiner* — Dhairya A Patel
(74) *Attorney, Agent, or Firm* — Davis Wright Tremaine LLP

(57) ABSTRACT

A customer of a computing resource service provider submits a request to a service in a first data region to obtain all customer data stored across all data regions managed by the computing resource service provider. Accordingly, the service may refer to a chatter table that includes a listing of locations wherein customer data may be stored to determine which data regions comprise customer data. Based on the determination, the service may transmit one or more requests to other services within the determined data regions to obtain the customer data while ignoring any data regions that do not comprise customer data. Upon receiving the customer data, the service may aggregate this data and provide the aggregated data to the customer to fulfill the customer request.

20 Claims, 14 Drawing Sheets

(56) References Cited

U.S. PATENT DOCUMENTS

2013/0339295 A1\* 12/2013 Dean ................... G06F 3/0611
707/610
2013/0346540 A1\* 12/2013 Dean .................. H04L 67/1097
709/214

\* cited by examiner

| Customer ID | Regions With Customer Data |
|---|---|
| Customer A | Region 1, Region 6, Region 8, Region 12 |
| Customer B | Region 1, Region 4, Region 15 |
| Customer C | Region 2 |
| Customer D | Region 5, Region 7 |

FIG. 7

METHOD FOR AGGREGATING DISTRIBUTED DATA

CROSS-REFERENCE TO RELATED APPLICATIONS

This application incorporates by reference for all purposes the full disclosure of co-pending U.S. patent application Ser. No. 14/206,625, filed concurrently herewith, entitled "CONSISTENCY OF QUERY RESULTS IN A DISTRIBUTED SYSTEM."

BACKGROUND

Computing resource service providers and other service providers often grant users access to one or more services to support the users' business needs. These services may be maintained and operated in multiple data regions, enabling users to select a data region for accessing these services, which may potentially reduce latency and provide higher throughput to each user of these services. Within a particular data region, many users, for example, may utilize these services to create a variety of resources and apply one or more metadata tags to these resources. Despite their many advantages, obtaining a consistent view of all customer resources across a plurality of data regions may be difficult. For example, coordination between multiple services across multiple data regions may present significant difficulties, particularly if any of these services are unavailable for a period of time. Thus, a user may, at least temporarily, be unable to obtain an accurate listing of all of his/her resources across the multiple data regions. Further, if a user submits a global query for user data through a service in a particular data region, the service within this particular data region may attempt to communicate with all the other data regions to locate all user data. This, in turn, may increase the latency and system requirements to obtain the data necessary to fulfill the query.

BRIEF DESCRIPTION OF THE DRAWINGS

Various embodiments in accordance with the present disclosure will be described with reference to the drawings, in which:

FIG. 7 shows an illustrative example of a chatter table comprising information for locating customer data within other data regions in accordance with at least one embodiment;

DETAILED DESCRIPTION

Figure 1:
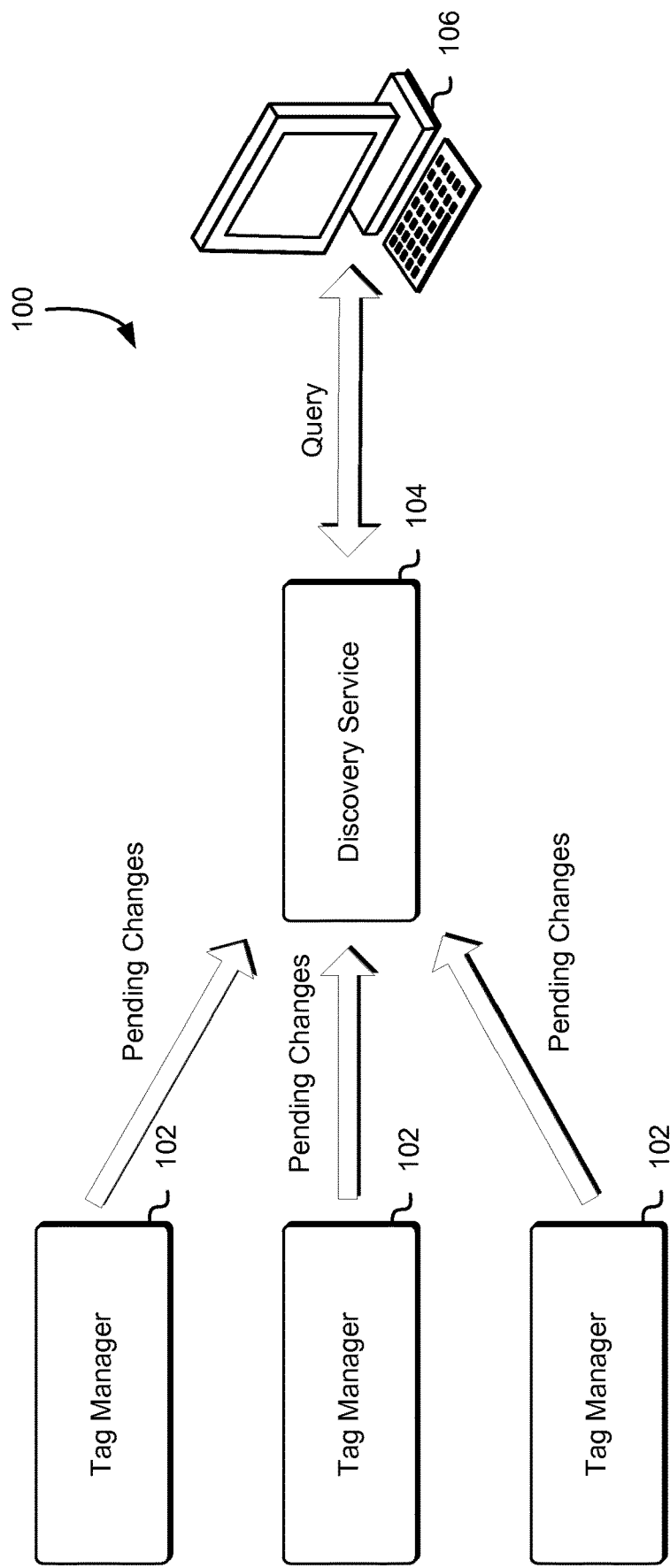
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improving the consistency of query results in a distributed system through synchronization of one or more tag services and to efficiently aggregating distributed data among one or more data regions. In an embodiment, an entity (e.g., an organization) communicates with a tag manager in a particular data region, such as through one or more application programming interface (API) calls to the tag manager, to request creation of a metadata tag that may, for example, be utilized to flag a particular virtual computer instance provided by a computing resource service provider. The entity may be a customer of a computing resource service provider that may utilize one or more services such as a virtual computer system service, object-based data storage services, database services, the aforementioned tag manager and a plurality of other services to support his or her business needs.

When a metadata tag is created using a tag manager, the tag manager may update a tag manager database in order to identify the location of the created metadata tag, the entity that requested creation of the metadata tag and other information and/or data that may be used to provide a response to any queries requesting zonal tag information. In some embodiments, the tag manager transmits one or more commands to a discovery service database, such as through one or more appropriately configured (e.g., formatted and with sufficient information so that the system receiving the call is able to process and fulfill the request) application programming interface (API) calls to the database, to update a changes data structure, such as a changes table within the discovery service database. The changes table may comprise a listing of all changes to all tag manager databases within a particular data region over a period of time. If the discovery service database is unavailable, the tag manager may transmit one or more executable instructions to a replicator within the tag manager that, when executed by the replicator, causes the replicator to synchronize the tag service database with the changes table within the discovery service database. Thus, the replicator may be configured to continue to determine the availability of the discovery service database and update the changes table within the discovery service database once the discovery service database becomes available again.

In an embodiment, the discovery service includes a change processor, which may be configured to scan for any new changes included in the changes table within the discovery service database. For instance, if an entity submit a tag query through the discovery service in a particular region, the discovery service may transmit one or more appropriately configured API calls to the change processor to determine whether any recent changes have been made to the changes table that have not been incorporated into the data tables within the discovery service database. Accordingly, if there are changes present in the changes table, the change processor may utilize these changes to update the data tables within the discovery service database and remove any entries in the changes table to prevent duplication of data within the data tables in the discovery service database. Once the data tables within the discovery service database have been updated, the discovery service may respond to the query submitted by the entity.

In an embodiment, each data region includes a data structure, such as a chatter table, which may specify where data is stored for each customer of the computing resource service provider. For instance, when a customer requests creation of a metadata tag within a data zone in a particular data region, the tag manager or discovery service may examine the chatter table stored in this particular data region to determine whether the customer currently has previously stored data in the data region. If the customer has not previously stored data in the data region, the tag manager or discovery service may update the chatter table to indicate that the customer now has data stored in this particular data region. Accordingly, in an embodiment, once the chatter table has been updated, the tag manager, the discovery service or some other service configured to communicate with all other data regions transmits this updated chatter table to the other data regions. This may cause the chatter table in each of the other data regions to be updated to reflect the recent storage of data for the customer in a particular data region.

In an embodiment, a customer can access a discovery service within any data region and submit a global query to obtain information regarding the customer's metadata tags stored throughout the various data regions. Accordingly, each discovery service within each data region may be configured to examine the chatter table within the data region and determine where the customer's metadata tags are stored. With this information, the discovery service may transmit one or more appropriately configured API calls to the other discovery service instances in the applicable data regions to obtain the customer data and provide a response to the customer query.

In this manner, an entity may be able to obtain consistent tag information from a discovery service in any particular data region. In addition, the techniques described and suggested herein facilitate additional technical advantages. For example, because the discovery service may only communicate with other selected data regions based at least in part on the chatter table, the discovery service may not be required to communicate with other data regions that do not comprise customer data in response to a customer global query. This, in turn, may reduce the added latency in retrieving information from other data regions and enable the discovery service to respond to the customer's query in a more rapid manner. In another example, because the replicator is configured to continuously synchronize the tag manager database with the changes table in the discovery service database, the discovery service may be able to provide contemporaneous results to a customer query, including results that may have been generated while the discovery service was unavailable.

FIG. 1 shows an illustrative example of an environment in which various embodiments can be implemented. In the environment 100, a tag manager 102 may be configured to transmit one or more pending changes (e.g., creation, deletion and/or modification) to one or more metadata tags to a discovery service database, which may include one or more identifiers which may be used by a discovery service 104 to obtain metadata tag information usable to respond to one or more customer queries for tag information. The tag manager 102 may be configured to create one or more metadata tags, which may be used for various purposes. For example, a user of the tag manager 102 may request creation of a metadata tag in order to apply a metadata tag to a virtual machine instance, the metadata tag usable to flag the virtual machine instance for the user's business needs. When a metadata tag is created by the tag manager 102, the tag manager 102 may update a first data store, such as a tag manager database, such that the first data store may comprise relevant information regarding the metadata tag, which may be used to respond to zonal tag queries.

When a new metadata tag has been created or an existing metadata tag has been modified, the tag manager 102 may transmit, to a second data store, such as a discovery service database, information regarding the relevant metadata tag. These pending changes may be stored in a changes table within the second data store (e.g., discovery service database) which may be accessed by a discovery service 104. The discovery service 104 may be configured to aggregate one or more zonal tags created using the tag manager 102 within each data zone in a particular data region. As will be described in greater detail in connection with FIG. 3, the computing resource service provider may host a variety of services in multiple locations worldwide. Accordingly, each of these locations may include one or more data regions, which may be used to access the services provided by the computing resource service provider and to generate a variety of resources that may be used to support its business. Each of these data regions may include one or more data zones, which may be designed to be isolated from other data zone failures. While the present disclosure extensively describes the changes table as being part of the discovery service database for the purpose of illustration, other configurations may be used to maintain updates to the tag manager databases. For instance, in an alternative embodiment, each tag manager database comprises a changes table, which may be updated upon creation of a zonal tag within a particular data zone through use of a corresponding tag manager. Accordingly, each tag manager may be configured to transmit its changes table to the discovery service database, which may use the changes table to update its own data tables usable to support zonal and regional tag queries.

The discovery service 104 may include a change processor, which may be a computer system (e.g., a single computer device or a distributed computer system) configured with executable instructions and/or hardware to periodically or on demand scan the changes table within the discovery service database to determine if any new changes have been added to the changes table. If changes have been made to the changes table, the change processor operating within the discovery service 104 may update all data tables within this discovery service database to incorporate these recent changes and remove these changes from the changes table to avoid future duplication of data. Accordingly, when the discovery service 104 receives a query or request from a customer to obtain current information regarding the one or more metadata tags that may be stored within a particular region, the discovery service 104 may transmit one or more appropriately configured API calls to the change processor to update the data tables within the discovery service database and obtain all information from the discovery service database necessary to fulfill the query or request.

Accordingly, as illustrated in FIG. 1, the environment 100 includes a customer 106. The customer 106 may be an individual or organization that could utilize one or more services, including the tag manager 102 and the discovery service 104, provided by the computing resource service provider to remotely manage computing resources to support his or her operations. The customer 106 may, through a customer computing device, submit one or more requests to the discovery service 104 to obtain information regarding one or more metadata tags that the customer 106 may be utilizing within the particular data region. Accordingly, when a customer 106 submit the one or more requests to the discovery service 104, the discovery service 104 may transmit one or more appropriately configured API calls to the change processor that may cause the change processor to access the changes table within the discovery service database to identify any changes to the metadata tags in each of the data zones in the region and update the data tables within the discovery service database based at least in part on these changes. Accordingly, the discovery service 104 may obtain the updated data from these data tables in the discovery service database and provide a response to the customer 106 query.

While metadata tags, a tag manager and discovery service are used extensively throughout the present disclosure for the purpose of illustration, other services and data within a distributed system may be used. For instance, the techniques described in the present disclosure may be applied to any service that is configured to manage data within one or more data zones within a particular data region. Accordingly, a secondary service may be created that may gather data stored within these one or more data zones and provide this data to a user of the secondary service.

Figure 2:
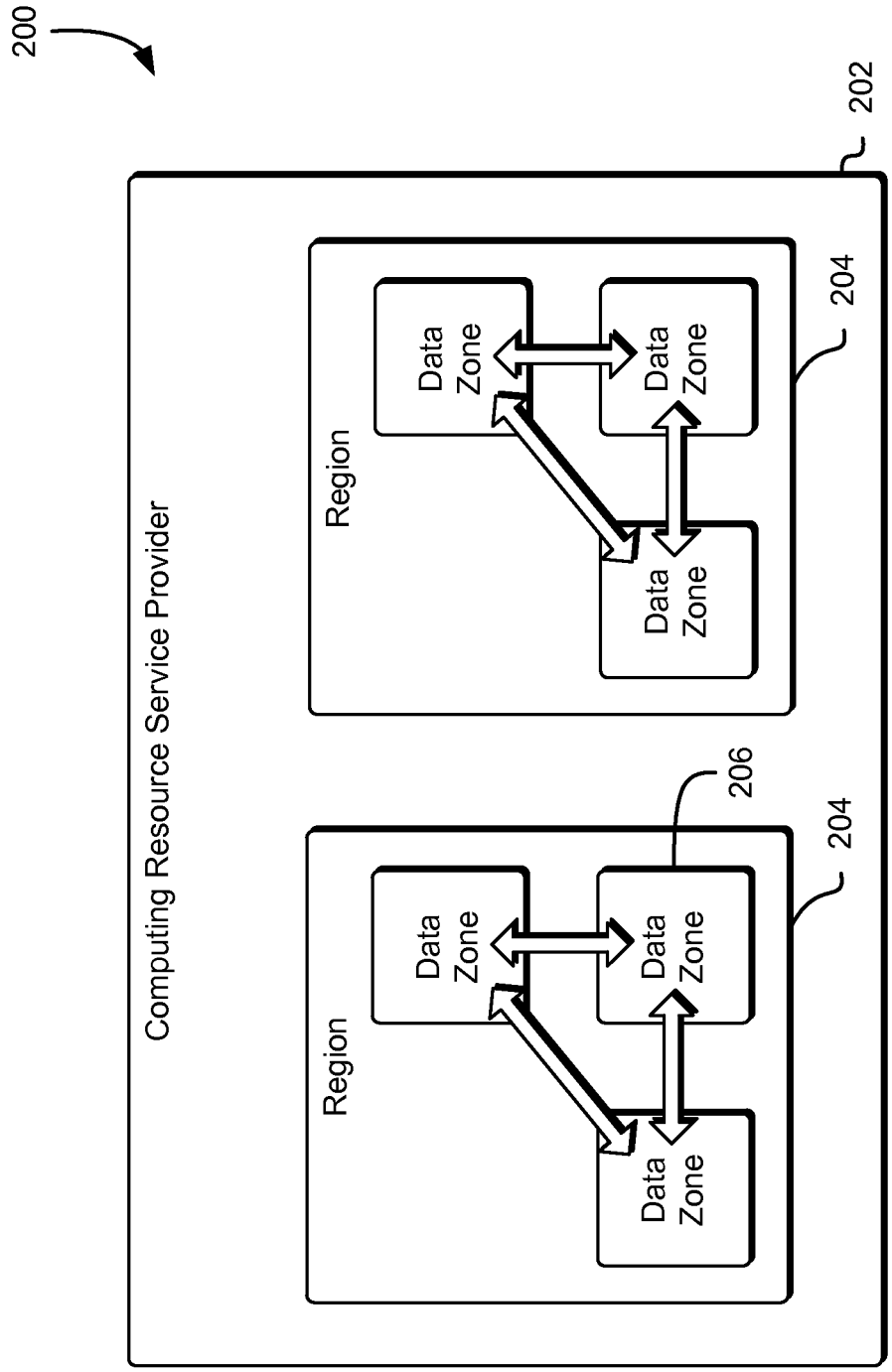
FIG. 2 shows an illustrative example of an environment in which various embodiments can be implemented.

As noted above, the computing resource service provider may maintain one or more data regions, which in turn may comprise one or more data zones for providing a number of services to the customer and for allowing the customer to generate and maintain resources necessary to support its business needs. Accordingly, FIG. 2 is an illustrative example of an environment 200 in which various embodiments can be implemented. The computing resource service provider 202 may host a variety of services in multiple locations worldwide. Accordingly, each of these locations may include one or more data regions 204, which may be used by a customer to access the services provided by the computing resource service provider 202 and to generate a variety of resources that may be used to support its business. For instance, a customer may access a data region 204 in order utilize a tag manager to create one or more metadata tags for use with a virtual machine instance. Accordingly, these metadata tags and the virtual machine instance may be instantiated within that particular data region 204 and thus may be independent from any other metadata tags and virtual machine instances in another data region. Thus, if a customer accesses a second data region 204, the resource that may have been generated in the first data region may not be available in this second data region.

Each independent data region 204 may comprise a number of isolated locations, or data zones 206, which may be designed to be isolated from other data zone failures. Each data zone 206 within a data region 204 may be connected through one or more links which may allow a customer to generate one or more replicas of the customer's resources in other data zones within the data region. Thus, if there is a failure of one data zone 206 within a data region 204, the resources may still be available through a different data zone. In order to maintain this isolation, each data zone 206 may operate using its own distinct infrastructure (e.g., servers, power supplies, cooling systems, networking systems, security systems, etc.) which may obviate the need to share common points of failure with other data zones within a data region 204. Thus, in the event of a failure of a particular data zone 206 (e.g., system failure, natural disaster, terrorism, etc.), other data zones within the data region 204 may not be affected.

As will be described in greater detail below, each independent data region 204 may further comprise a chatter table, which may include one or more identifiers that may be used to identify which data regions comprise customer data. For instance, if a customer accesses a first data region 204 and, through a discovery service, transmits a request to obtain information regarding all data stored across all the data regions, the discovery service may refer to the chatter table to identify a subset of all the data regions that may comprise customer data. Accordingly, the discovery service may transmit one or more appropriately configured API calls to a second data region of the subset of data regions that comprise customer data to obtain the requested information. Additionally, when a customer submits a request to a tag manager within a data zone 206 in a particular data region 204 to create one or more new metadata tags, the chatter table may be updated to reflect that the customer now has data stored within this particular data region 204. Accordingly, this updated chatter table may be transmitted to all other data regions for reference.

Figure 3:
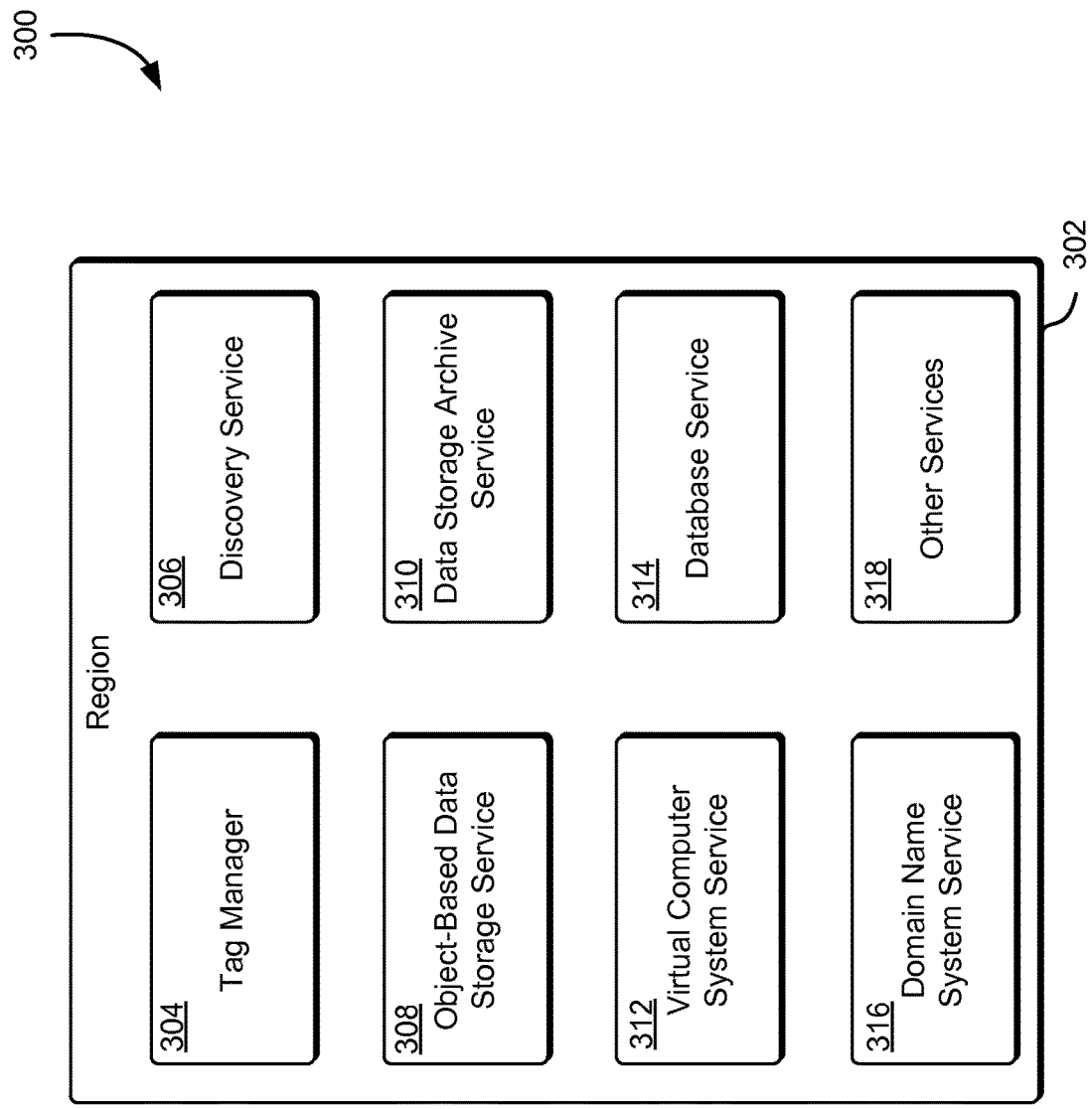
FIG. 3 shows an illustrative example of an environment in which various embodiments can be implemented.

As noted above, each data region may be configured to provide a number of services which may be used by a customer to support its business. Accordingly, FIG. 3 is an illustrative example of the one or more services that may be maintained and operated within a data region 302 according to at least one embodiment. In this illustrative example, the computing resource service provider may configure each data region 302 to provide at least seven types of services. The services provided by the computing resource service provider that may be included in each data region 302, in this example, include a tag manager 304, a discovery service 306, an object-based data storage service 308, a data storage archive service 310, a virtual computer system service 312, a database service 314, a domain name system service 316 and one or more other services 318, although not all embodiments of the present disclosure will include all such services and additional services may be provided in addition to or as an alternative to services explicitly described herein. Each service may comprise an interface or client which may be utilized by the customer to access computing resources that may be included in the respective service.

The tag manager 304 may be a collection of computing resources configured to create a metadata tag within a particular data zone upon request and provide responses to one or more zonal metadata tag queries. Customers of the computing resource service provider may interact with the tag manager 304 through a tag manager client to submit one or more requests for creation of metadata tags and/or submit the one or more zonal queries. When a customer requests creation of a metadata tag, the tag manager 304 may update a tag manager database, which may include a listing of each metadata tag created, along with the location of each metadata tag within the particular data zone and the customer that requested creation of each metadata tag. Thus, if a customer submits a query to the tag manager 304 to obtain information regarding each metadata tag the customer has created within the data zone, the tag manager 304 may communicate with the tag manager database to obtain the required information to fulfill the query.

When a customer requests creation of a metadata tag, the tag manager 304 may further attempt to update a changes table within a discovery service database to specify that one or more metadata tags have been added to the data zone. If the discovery service database is unavailable for any reason, such that the changes table cannot be updated, the tag manager 304 may utilize a replicator, which may be a computer system (e.g., a single computer device or a distributed computer system) configured with executable instructions and/or hardware to synchronize the changes table and the tag service database when the discovery service database becomes available again. This may enable the changes table to include a consistent listing of all new metadata tags added to the particular data zone through use of the tag manager 304.

The discovery service 306 may be a collection of computing resources configured to aggregate data zone metadata tags created using the tag manager 304 in any of the data zones within the data region 302 to respond to regional and/or global queries. Accordingly, the discovery service 306 may be configured to operate in conjunction with the tag manager 304 to maintain consistent metadata tag information. As noted above, the tag manager 304 may be configured to update the changes table within the discovery service database to specify that one or more metadata tags have been added to the data zone. Accordingly, the discovery service 306 may include a change processor, which may be configured to scan the changes table in the discovery service database for any new changes and, if any new changes are present, update the data tables within the discovery service database to reflect these changes. Once the data tables have been updated, the change processor may clear the changes table in order to prevent duplication of data within the data tables.

The discovery service 306 may comprise a discovery service client, which customers of the computing resource service provider may utilize to submit a request or query for metadata tag information within the data region 302. Accordingly, the discovery service 306 may transmit one or more appropriately configured API calls to the change processor to determine whether any changes have been made to the changes table within the discovery service database. If there are any changes, these changes may be incorporated into the data tables within the discovery service database and, in response to the request or query, the discovery service 306 may provide the corresponding metadata tag information to the customer.

The object-based data storage service 308 may comprise a collection of computing resources that collectively operate to store data for a customer. The data stored in the data storage service 308 may be organized into data objects. The data objects may have arbitrary sizes except, perhaps, for certain constraints on size. Thus, the object-based data storage service 308 may store numerous data objects of varying sizes. The object-based data storage service 308 may operate as a key value store that associates data objects with identifiers of the data objects which may be used by the customer to retrieve or perform other operations in connection with the data objects stored by the object-based data storage service 308. Access to the object-based data storage service 308 may be through appropriately configured API calls.

The data storage archive service 310 may comprise a collection of computing resources that collectively operate to provide storage for data archiving and backup of customer data. The data storage archive service 310 may thus be configured to persistently store data that may be infrequently accessed and for which long retrieval times are acceptable to a customer utilizing the service. A customer may interact with the data storage archive service 310 to generate one or more archives. Each archive may represent one or more data files that may be combined to form the archive. Accordingly, a customer, through appropriately configured API calls to the service, may upload and retrieve archives from the data storage archive service 310 and monitor the retrieval of these archives, as each retrieval job may typically require several hours to complete.

The virtual computer system service 312 may be a collection of computing resources configured to instantiate virtual machine instances onto virtual computing systems on behalf of the customers of the computing resource service provider. Customers of the computing resource service provider may interact with the virtual computer systems' service to provision and operate virtual computer systems that are instantiated on physical computing devices hosted and operated by the computing resource service provider. The virtual computer systems may be used for various purposes, such as to operate as servers supporting a website. Other applications for the virtual computer systems may be to support database applications, electronic commerce applications, business applications and/or other applications.

The database service 314 may be a collection of computing resources that collectively operate to run one or more databases for one or more customers. Customers of the computing resource service provider may operate and manage a database from the database service 314 by utilizing appropriately configured API calls. This, in turn, may allow a customer to maintain and potentially scale the operations in the database.

The Domain Name System (DNS) service 316 may be designed to give customers a method to route end users to one or more communications network applications. For instance, the DNS service 316 may be configured to translate human-readable names, such as uniform resource locators (URLs), into numeric Internet Protocol (IP) addresses that computer systems may use to connect to each other over the Internet. Thus, the DNS service 316 may be configured to connect requests to access one or more services provided by the computing resource service provider to the infrastructure that is operating within a particular data zone. The DNS service 316 may additionally be configured to route customers of the computing resource service provider to infrastructure outside of a particular data zone, such as another computing system operated by a separate provider.

The computing resource service provider may additionally maintain one or more other services 318 in each data region 302 based on the needs of its customers. For instance, the computing resource service provider may maintain an account service which may comprise a collection of computing resources that collectively operate to maintain customer account information for each customer of the computing resource service provider. The account service may include, for example, the customer name, address, phone numbers, billing details and other personal identification information for each customer of the computing resource service provider. Additionally, the account service may include cryptographic keys or other credentials that may be used to verify that a customer has the proper authorization to access the one or more services provided by the computing resource service provider. Other services include, but are not limited to, authentication services and services that manage other services and/or other services.

Figure 4:
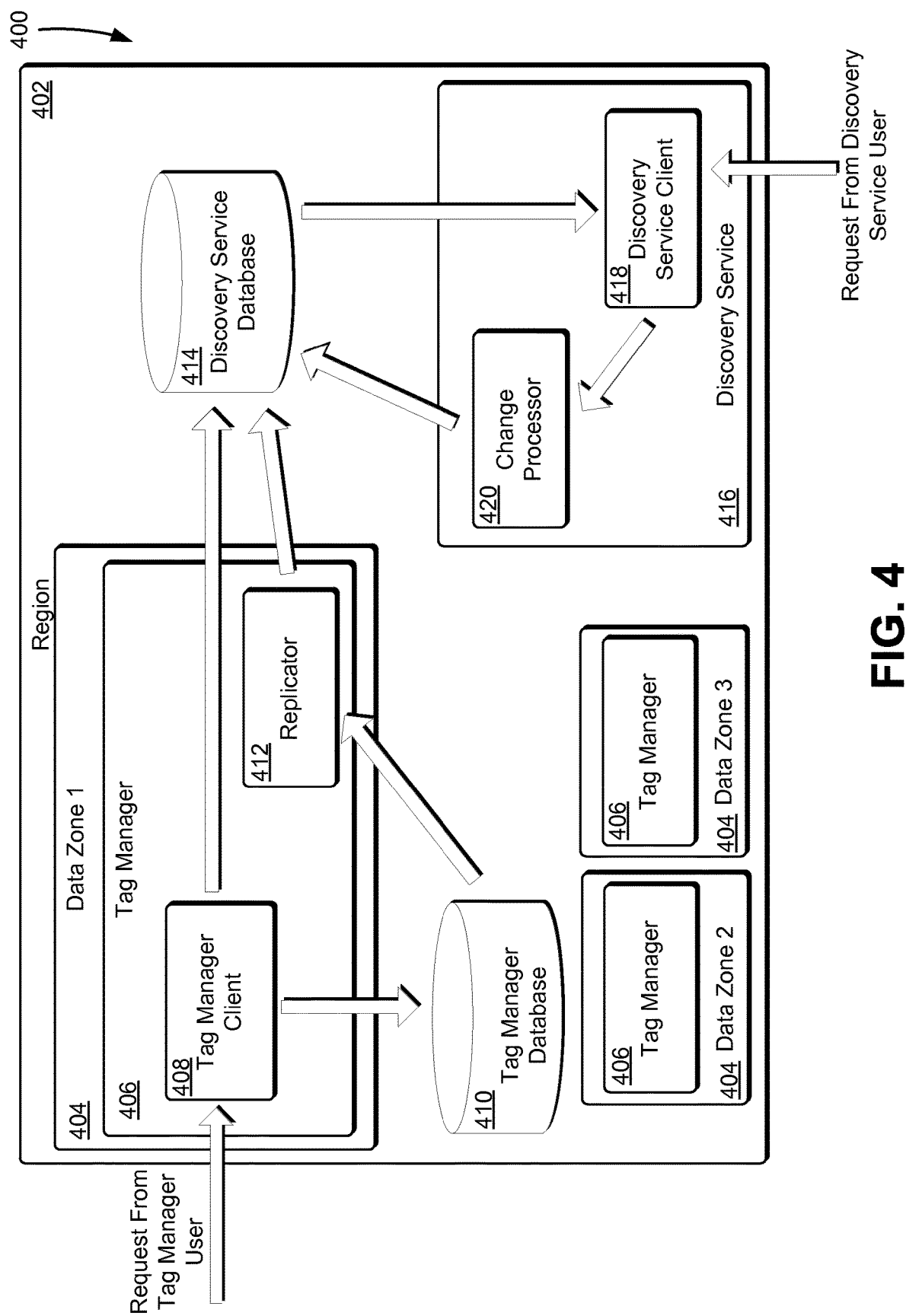
FIG. 4 shows an illustrative example of storing and accessing one or more tags within a region in accordance with at least one embodiment.

As noted above, each data region may include a tag manager and a discovery service, which may collectively be configured to provide tag management within the particular data region. Accordingly, FIG. 4 shows an illustrative example of an environment 400 for storing and accessing one or more tags within a data region 402 in accordance with at least one embodiment. Each data region 402 may comprise one or more data zones 404, which may be designed to be isolated from other data zone failures. Accordingly, as illustrated in FIG. 4, each data zone 404 may include a tag manager 406, which may be configured to enable a user of the tag manager 406, to create and manage zonal metadata tags within the respective data zone 404. Further, the tag manager 406 may be configured to enable a user of the tag manager 406 to submit one or more requests or queries in order to obtain information and/or manage his/her metadata tags with the particular data zone 404.

Accordingly, a tag manager 406 within each data zone 404 may comprise a tag manager client 408, which may be used by a user of the tag manager 406 (e.g., customer of the computing resource service provider) to submit one or more requests to create a metadata tag within the particular data zone 404 and to submit queries to obtain information regarding his/her metadata tags within the particular data zone 404. The tag manager client 408 may include an interface, which a user of the tag manager 406 may utilize to interact with tag manager 406 and submit these requests and/or queries. When a user of the tag manager 406 submits a request to create a new metadata tag or modify an existing tag, the tag manager client 408 may transmit one or more appropriately configured API calls to a tag manager database 410 in order to update the tag manager database 410 based at least in part on the user's request. For instance, if a user of the tag manager 406 requests, through the tag manager client 408, that a new metadata tag be created and applied to an existing virtual machine instance, the tag manager client 408 may update the tag manager database 410 to reflect the creation of this new metadata tag, the user that requested creation of the tag and the location of the tag within the data zone 404 and/or data region 402.

In an embodiment, when a user of the tag manager 406 requests creation of a new metadata tag or requests modification of an existing metadata tag, the tag manager client 408 further transmits one or more appropriately configured API calls to a discovery service database 414 to update a changes table within the discovery service database 414 to reflect the creation or modification of a metadata tag. If the tag manager client 408, configured to monitor the discovery service database 414 to determine whether the API calls are successfully processed, is unable to update the changes table within the discovery service database 414 (e.g., the discovery service database 414 is unavailable, corrupted, etc.), a replicator 412 operating within the tag manager 406 may continue to attempt to synchronize the changes table in the discovery service database 414 with the tag manager database 410 to ensure that the data stored is consistent. The replicator 412 may be configured to perform this synchronization after a certain amount of time has elapsed or as a result of a triggering event (e.g., a certain number of metadata tags have been added to the tag manager database 410). Thus, if the tag manager client 408 is unable to update the changes table within the discovery service database 414, the replicator 412 may continue to attempt to update the changes table until it is successful.

Each particular data region 402 may further include a discovery service 416, which may be configured to aggregate the zonal metadata tags within the data region 402 to provide responses to regional and global queries. The discovery service 416 may comprise a discovery service client 418, which may be used by a customer of a computing resource service provider or other user of the discovery service 416 to submit one or more queries to obtain information regarding his/her or metadata tags within the data region 402. For instance, a customer of a computing resource service provider may utilize the discovery service client 418 to request information regarding all metadata tags within the data region 402 that are used in conjunction with one or more virtual machine instances.

When the discovery service client 418 receives a request or query regarding the metadata tags stored within the data region 402, the discovery service client 418 may transmit one or more appropriately configured API calls (e.g., AnyPendingChanges( )) to a change processor 420 within the discovery service 416 to determine whether the data tables in the discovery service database 414 are consistent with the data in the tag manager database 410. Accordingly, the change processor 420 may be configured to scan the changes table within the discovery service database 414 to determine if any changes have been made since the previous scan of the changes table. If the changes table has been updated as a result of creation and/or modification of one or more metadata tags in the tag manager database 410, the change processor 420 may utilize these changes to update all the data tables within the discovery service database 414. Once the data tables have been updated, the change processor 420 may transmit one or more appropriately configured API calls to the discovery service database 414 to remove the changes from the changes table in order to prevent duplication of data in the data tables within the discovery service database 414.

In an embodiment, the change processor 420 is configured to scan the changes table within the discovery service database 414 to determine if any changes have been made since the previous scan of the changes table at particular time intervals or as a result of a triggering event. For instance, the change processor 420 may utilize the changes within the changes table to update all data tables within the discovery service database 414 even if the discovery service client 418 has not received a request or query for metadata tags associated with a user of the discovery service 416. In an embodiment, the changes table includes a queue of changes that are to be processed for each customer of the discovery service 416. Accordingly, when a customer submits a request to obtain his/her metadata tags, the change processor 420 may find any entries for the customer within the changes table and move these changes to the top of the queue. Accordingly, the change processor 420 may use these changes to update the data tables within the discovery service database 414 without having to process any other changes included in the changes table.

Once all the data tables in the discovery service database 414 have been updated, the discovery manager client 418 may transmit one or more appropriately configured API calls (e.g., Get( )) to the discovery manager database 414 to obtain metadata tag information necessary to fulfill the user's request. Accordingly, the discovery manager client 418 may allow the user to examine the information for his or her business needs.

Figure 5:
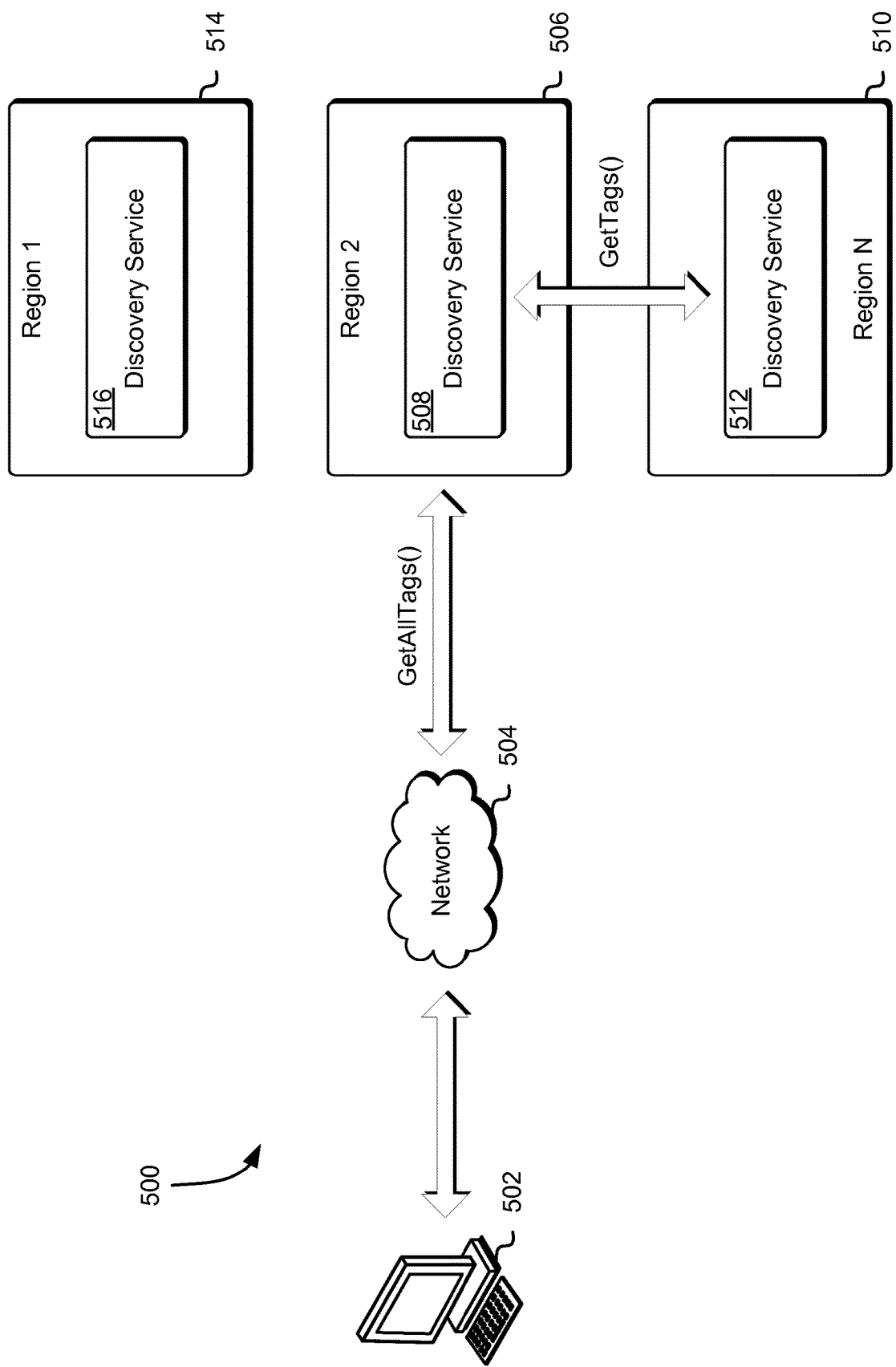
FIG. 5 shows an illustrative example of an environment in which one or more customer metadata tags are retrieved from only regions comprising customer metadata tags in accordance with at least one embodiment.

As noted above, a customer of a computing resource service provider may access a particular data region and, through a discovery service within the data region, submit a request to obtain information regarding all metadata tags assigned to the customer throughout all the regions managed by the computing resource service provider. Accordingly, FIG. 5 shows an illustrative example of an environment 500 in which one or more customer metadata tags are retrieved from only regions comprising customer metadata tags in accordance with at least one embodiment. In the environment 500, a customer 502 may access one or more services provided by a computing resource service provider through a data region 506 (e.g., Region 2 as illustrated in FIG. 5) through one or more communications networks 504, such as the Internet. For instance, the customer 502 may utilize a discovery service 508 within the particular data region 506 to obtain information regarding one or more metadata tags within the data region 506.

Once the customer 502 has established a connection with a discovery service 508 within the data region 506, the customer 502 may submit a request to the discovery service 508, such as through one or more appropriately configured API calls to the service (e.g., GetAllTags( )), to obtain information regarding all metadata tags assigned to the customer 502 throughout all data regions managed by the computing resource service provider. Accordingly, the discovery service 508 within the particular data region 506 may be configured to determine which other data regions comprise customer metadata tags. For instance, in an embodiment, each data region 506, 510, 514 includes a chatter table that comprises a listing of data stored for each customer of the computing resource service provider. Thus, the discovery service 508 within the particular data region 506 may be configured to refer to this chatter table to determine which other data regions comprise customer data.

Accordingly, the discovery service 508 within the particular data region 506, based at least in part on the information stored within the chatter table, may transmit a request to a discovery service 512 within a data region comprising customer data 510 to obtain the customer metadata tag information. However, the discovery service 508 within the particular data region 506 may not transmit a request to a discovery service 516 within a data region that does not comprise customer data, as the chatter table may not include this data region 514 within the customer listing. Thus, the discovery service 508 may be configured to only communicate with other data regions if these other data regions comprise customer data, as listed in the chatter table.

Figure 6:
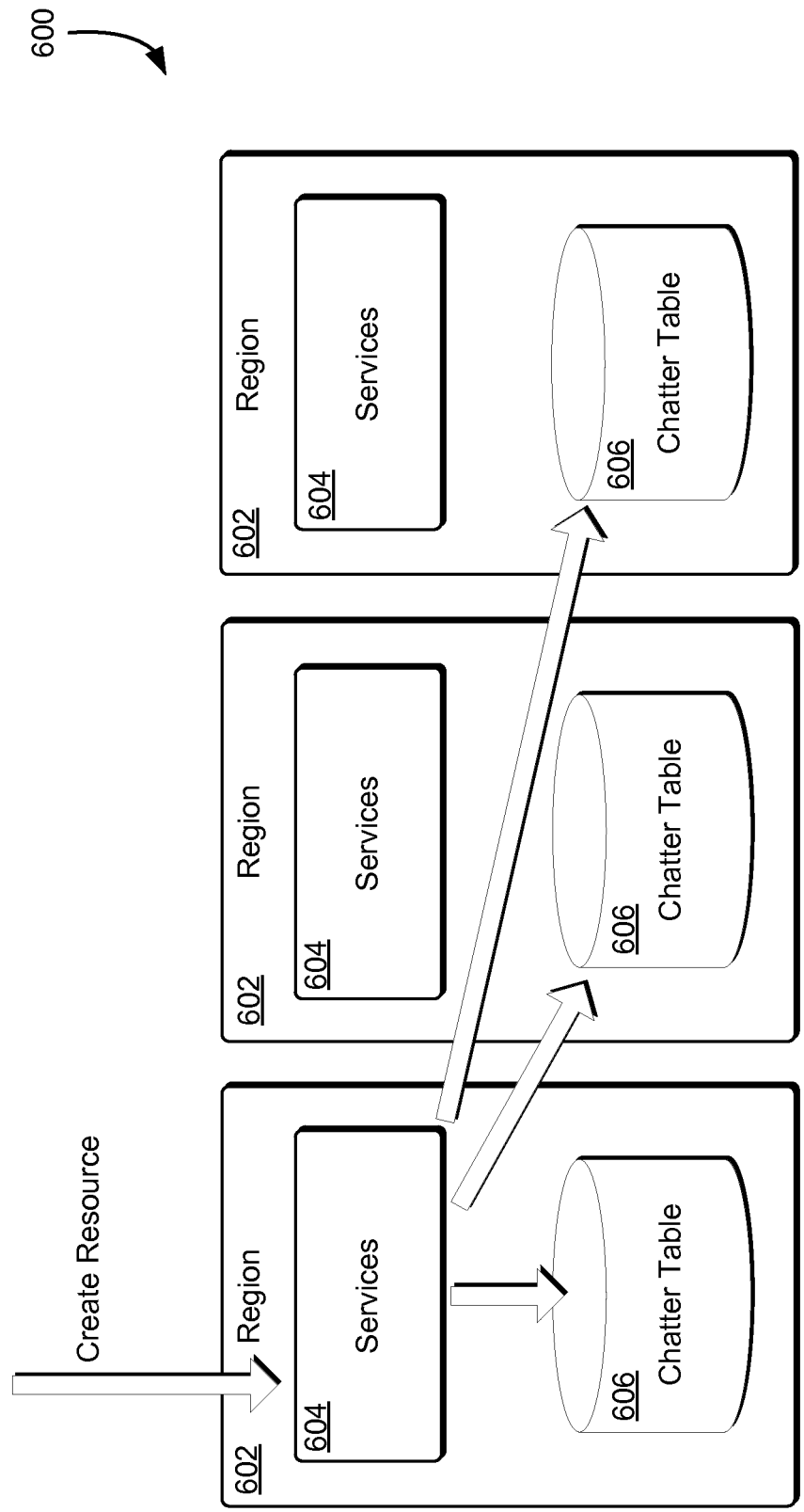
FIG. 6 shows an illustrative example of one or more components that may comprise a data region in accordance with at least one embodiment.

As noted above, each data region may comprise a number of services which may be used by a customer of the computing resource service provider to support his or her business needs. Further, each data region may comprise a chatter table, which may be used to determine which data regions comprise customer data and/or other information. Accordingly, FIG. 6 shows an illustrative example of an environment 600 that includes one or more components that may be included in a data region 602 in accordance with at least one embodiment. As described above in connection with FIG. 6, each data region 602 may comprise one or more services 604, which a customer or other user of the computing resource service provider may utilize for a variety of purposes. For instance, the services 604 provided by the computing resource service provider that may be included in each data region 602 may include a tag manager, a discovery service, an object-based data storage service, a data storage archive service, a virtual computer system service, a database service, a domain name system service and one or more other services, although not all embodiments of the present disclosure will include all such services and additional services may be provided in addition to or as an alternative to services explicitly described herein. Each service may comprise an interface or client which may be utilized by the customer to access computing resources that may be included in the respective service.

Additionally, each data region 602 may include a chatter table 606 which may include a listing of customer data stored within all data regions managed by the computing resource service provider. For instance, the chatter table 606 may be configured to include a column that includes a listing of all customers of the computing resource service provider. Further, the chatter table 606 may include a second column that includes a listing of the particular data regions where data is stored for each customer of the computing resource service provider. Accordingly, if a customer utilizes the one or more services 604 within a particular data region 602 to generate new customer data, the one or more services 604 may be configured to update the chatter table 606 in order to reflect this action. The one or more services 604 may further transmit this updated chatter table 606 to the other data regions managed by the computing resource service provider such that the chatter table in each of these data regions is kept consistent throughout. Alternatively, the one or more services 604 may further transmit an update to each chatter table 606 in the other data regions in order to maintain this consistency among the chatter tables.

If a customer submits a request, through the one or more services 604, to obtain data from all data regions where data is stored for the customer, the one or more services 604 may be configured to refer to the chatter table 606 to identify the one or more data regions where the data is stored. Accordingly, based at least in part on the information stored within the chatter table 606, the one or more services 604 within the particular data region 602 may transmit one or more appropriately configured API calls to only the corresponding services in the other data regions that may comprise customer data to obtain this data. The one or more services 604 may be configured to aggregate this customer data and provide the aggregated data to the customer in response to his/her request. Thus, there may be no communication between the one or more services 604 and the data regions that do not comprise customer data.

As noted above, the chatter table in each data region may comprise one or more columns that may include information usable by one or more services within a particular data region to identify any other data regions that may comprise customer data. Accordingly, FIG. 7 shows an illustrative example of a chatter table 700 comprising information for locating customer data within other data regions in accordance with at least one embodiment. The chatter table 700 illustrated in FIG. 7 comprises two columns. The first column that may be included in a chatter table 700 is a customer identification column 702, which may include a listing of all customers of the computing resource service provider that maintains data in at least one data region. For instance, in this illustrative example, the customer identification column 702 within the chatter table 700 includes at least four customers. These customers may have, at a previous time, accessed one or more services in one or more data regions managed by the computing resource service provider to generate customer data. As noted above, when a customer utilizes one or more services within a data region to generate new customer data, the one or more services may be configured to access and update the chatter table 700 to reflect the generation of this new customer data. Accordingly, if a customer generates new data within a particular data region, and the customer is not included in the chatter table 700, the one or more services within the particular data region may create a new entry within the customer identification column to include this customer.

The chatter table 700 may further include a data region column 704, which may be used to provide a listing of the data regions managed by the computing resource service provider that include customer data for each customer listed in the customer identification column 702. For instance, as illustrated in FIG. 7, Customer A may have customer data stored within Regions 1, 6, 8 and 12. Thus, if this customer submits a request within a particular data region to obtain all data stored within the one or more data regions maintained by the computing resource service provider, one or more services within the particular data region may refer to this chatter table 702 and determine that the customer has data stored in Regions 1, 6, 8 and 12. Accordingly, the one or more services may transmit one or more appropriately configured API calls to the corresponding one or more services within Regions 1, 6, 8 and 12 to obtain all of the customer's data.

While a customer identification column 702 and a data region column 704 are used extensively throughout the present disclosure for the purpose of illustration, the chatter table 700 may comprise fewer or additional columns in order to provide information regarding customer data that may be stored within the one or more data regions managed by the computing resource service provider. For instance, in addition to the customer identification column 702 and the data region column 704, the chatter table 700 may include a column for describing what type of customer data is stored within each data region included in the data region column 704. This may be used to only enable relevant services to communicate with other data regions that may comprise customer data usable by the relevant services.

As noted above, when a customer, through one or more services within a particular data region, submits a request to generate new customer data, the one or more services may be configured to examine the chatter table 700 to determine whether the customer has previously generated customer data within the particular data region. If the customer has not previously generated customer data, the one or more services may update the chatter table 700, such as through the customer identification column 702 and/or the data region column 704, to reflect that customer data is now stored within the particular data region. Further, the one or more services within the particular data region may communicate with the other data regions to synchronize the updated chatter table 700 with the chatter tables included in these other data regions in order to maintain consistency of the information stored therein.

Figure 8:
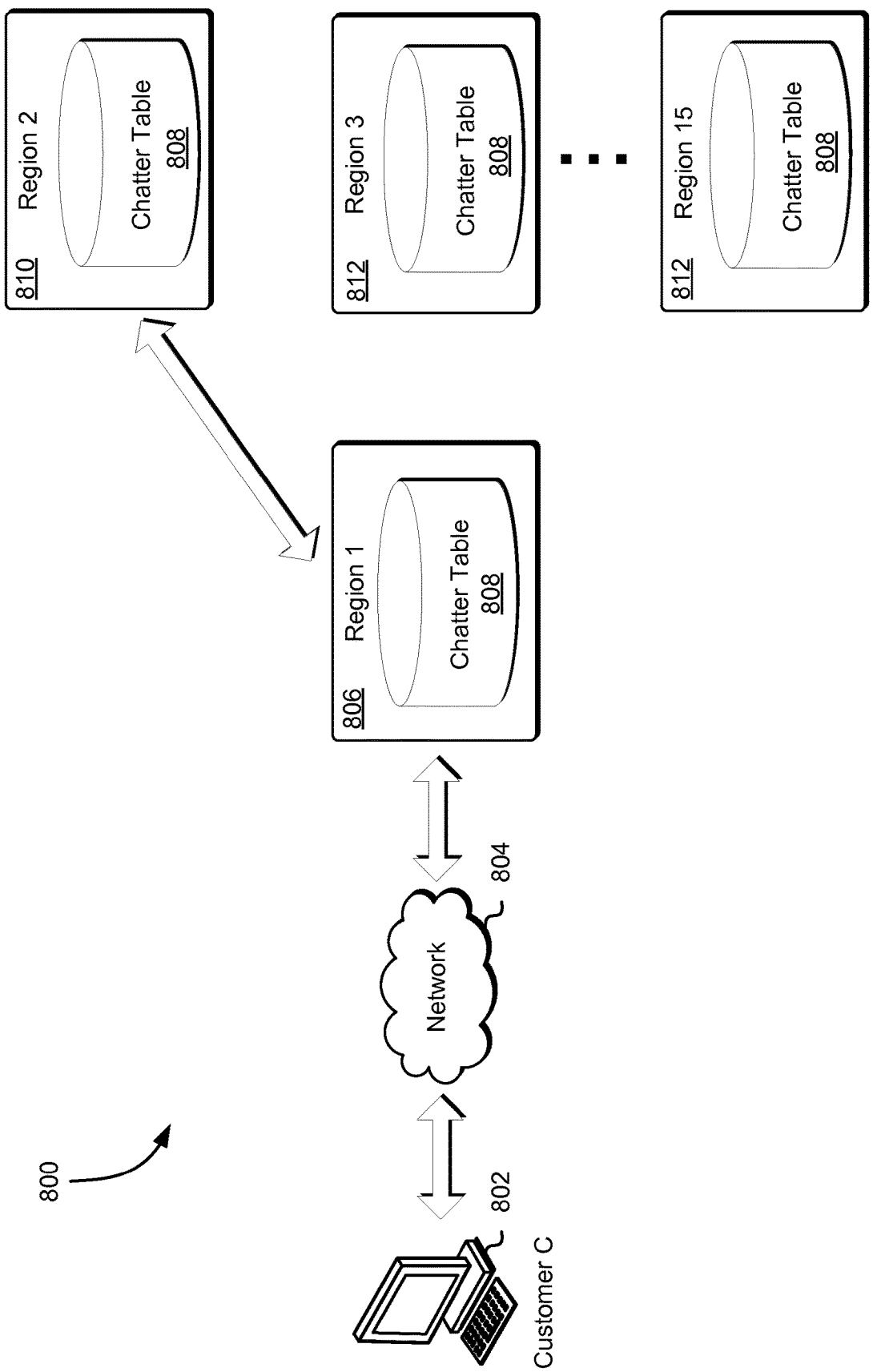
FIG. 8 shows an illustrative example of retrieving customer data from one or more data regions based at least in part on a chatter table in accordance with at least one embodiment.

As noted above, one or more services within a particular data region may access a chatter table within this particular data region to determine where customer data may be stored across one or more data regions managed by a computing resource service provider. Accordingly, FIG. 8 shows an illustrative example of an environment 800 wherein one or more services within a particular data region 806 may retrieve customer data from one or more data regions based at least in part on a chatter table 808 in accordance with at least one embodiment. As noted above, a customer 802 of a computing resource service provider may communicate with one or more services within a particular data region 806 through one or more communications networks 804, such as the Internet. Accordingly, the customer 802 may communicate with these one or more services, such as through one or more appropriately configured API calls, to submit a query for all customer data that may be stored within the various data regions 806, 810, 812 managed by the computing resource service provider.

Each data region 806, 810, 812 may include a chatter table 808, such as the chatter table illustrated in FIG. 7, which may comprise a listing of all customer data stored within the one or more data regions managed by the computing resource service provider. When a customer 802 submits a requests to a service within a particular data region 806 to create new customer data (e.g., metadata tags, virtual machine instances, logical data containers, etc.), the service may access the chatter table 808 within the particular data region 806 to update the chatter table 808 in order to reflect the creation of this new customer data. For instance, as illustrated in FIG. 7, if Customer C utilizes a service within Region 2 to generate new customer data, this service may update the chatter table within Region 2 to reflect that the customer has data stored within Region 2. Accordingly, when the chatter table 808 is updated to reflect these changes, the service within the particular data region 806 or another service or process configured to coordinate communications between multiple data regions may provide the updated chatter table 808 to the other data regions 810, 812 in order to ensure that each data region maintains consistent information regarding the locations of customer data.

Using Customer C as illustrated in FIG. 7 as an example, when Customer C submits a request to a service within a particular data region 806 (in this case Region 1) to obtain information regarding customer data that may be stored within one or more data regions managed by the computing resource service provider, this service may access the chatter table 808 within the particular data region 806 to determine the locations of customer data. Accordingly, this service, based at least in part on the information included within the chatter table 808, may determine that Customer C has customer data stored within a second data region 810 (in this case Region 2). Subsequently, the service may communicate with another service within the second data region 810, such as through one or more appropriately configured API calls to the other service, to obtain the customer data necessary to fulfill the customer request. Since Customer C does not have customer data stored in any other data regions 812 (e.g., Regions 3 through 15), the service may not communicate with other services in these other data regions 812.

Figure 9A:
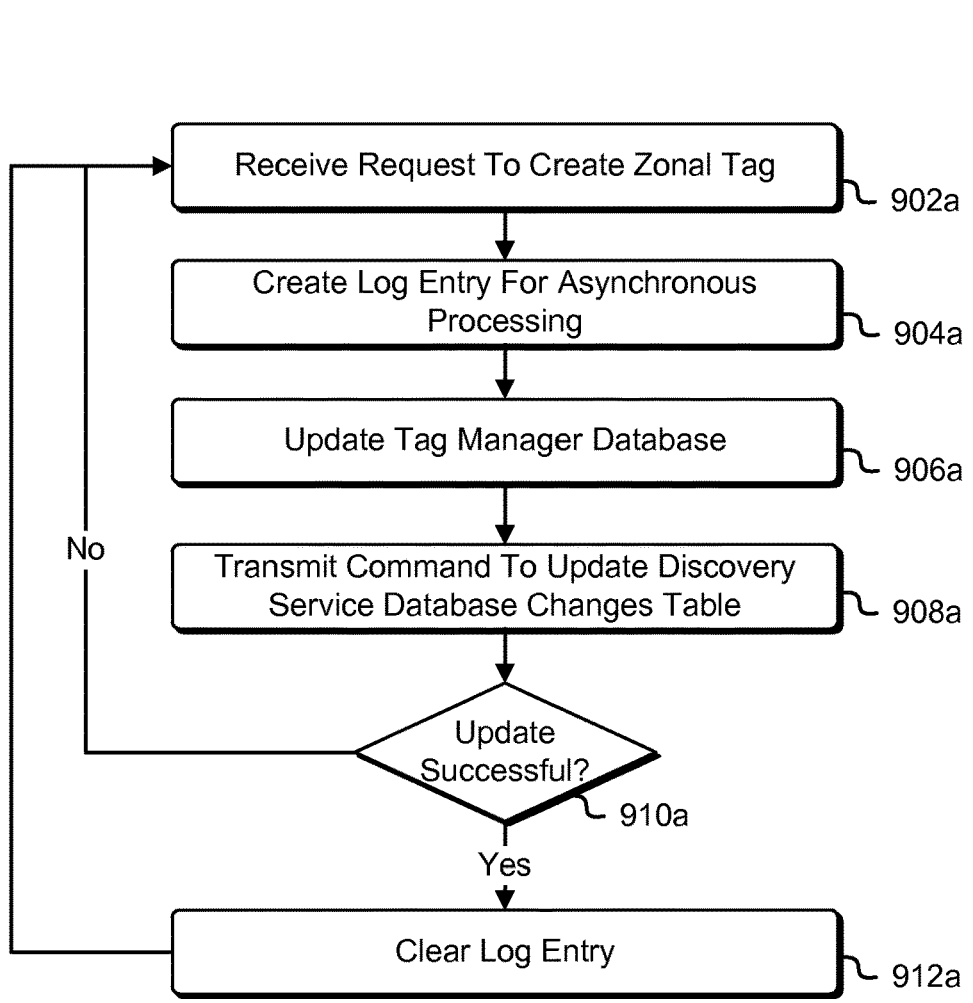
FIG. 9a shows an illustrative example of a process for creating a zonal tag and synchronizing a tag manager database and a discovery service database in accordance with at least one embodiment.

As noted above, when a customer submits a request to a tag manager within a data zone to create a zonal metadata tag, the tag manager may update both a tag manager database and a changes table within a discovery service database in order to support zonal and regional/global queries. Accordingly, FIG. 9a shows an illustrative example of a process 900a for creating a zonal tag and synchronizing a tag manager database and a discovery service database changes table in accordance with at least one embodiment. The process 900a may be performed by a tag manager operating within a data zone in a particular data region configured to transmit one or more appropriately configured API calls to both a tag manager database and a discovery service database. Further, the tag manager may comprise a replicator, which may be used to synchronize the tag manager database and a changes table within the discovery service database to maintain consistent information between both databases.

A customer of a computing resource service provider may be granted access to one or more services within a particular data region to access customer data and other resources. Accordingly, a customer may be able to access a tag manager within a data zone to request creation of one or more zonal metadata tags. These zonal metadata tags may be used for a variety of purposes. For instance, the customer may request creation of a zonal metadata tag in order to flag an existing virtual machine instance within the data region to easily identify this virtual machine instance from other virtual machine instances the customer may use. Accordingly, the tag manager may receive 902a a request to generate one or more zonal metadata tags.

Once a new zonal metadata tag has been created, the tag manager may create 904a a new log entry for the created zonal metadata tag within tag manager database to support asynchronous processing of the newly created tag. As will be described in greater detail below in connection with FIG. 9b, a log may be maintained by the tag manager that includes a listing of zonal metadata tags that may need to be synchronized with a discovery service database changes table. As each log entry is transmitted to the discovery service database, if the update of the changes table is successful, the log entry may be deleted from the log. However, if the update is not successful, the log may still maintain the log entry for the metadata tag, causing the tag manager to attempt, at a later time, to transmit the log entry to the changes table.

Once the log entry for the newly created zonal tag has been created and, as a result, the log has been updated, the tag manager may update 906a the tag manager database to include an entry for this newly created zonal tag. The tag manager database may comprise a listing of all zonal metadata tags within a particular data zone, along with customer information associated with each of these zonal metadata tags. Thus, if a customer submits a query to the tag manager to obtain information regarding all of the customer's zonal metadata tags within a data zone, the tag manager may be able to obtain this information by referring to the tag manager database and prepare a response to the query based at least in part on the information included within the tag manager database.

In addition to updating the tag manager database based at least in part on the creation of one or more zonal metadata tags, the tag manager may transmit 908a a command to a discovery service database to attempt to update a changes table within the discovery service database based at least in part on the log managed by the tag manager that may include log entries for the one or more zonal tags that have yet to be synchronized with the changes table. This changes table may include a listing of zonal metadata tags created since a certain period of time and may mirror information included in the tag manager database. As noted above, the changes table is usable by a discovery service to update the data tables within the discovery service database, which, in turn, may be used to fulfill one or more regional and/or global queries regarding metadata tag information. The discovery service may comprise a change processor which may be configured to refer to this changes table within the discovery service database to obtain the latest changes to the zonal tag manager databases and update the data tables within the discovery service database based at least in part on these latest changes.

Once the tag manager has transmitted this command to the discovery service database, the tag manager may determine 910a whether the update of the changes table was successful. For instance, if the discovery service database is unavailable or corrupted, the tag manager may be unable to update the discovery service database until the discovery service database is made available again. Accordingly, if the update of the changes table was unsuccessful, the tag manager may continue to receive 902a requests from users of the tag manager to create one or more zonal tags. Further, the log entry created for asynchronous processing may still be present within the log managed by the tag manager, such that the tag manager may continue to attempt to transmit commands to the discovery service to update the discovery service database changes table.

If the tag manager is successful in updating the changes table within the discovery service database, the tag manager may clear 912a the log entry from the log in order to prevent duplication of data within the discovery service database changes table and may continue to receive 902a requests from one or more customers to generate new zonal metadata tags. Thus, as new zonal metadata tags are created, the tag manager may continue to update the changes table within the discovery service database to reflect the creation of these new zonal metadata tags and support the discovery service function of providing responses to regional and/or global queries for customer information.

Figure 9B:
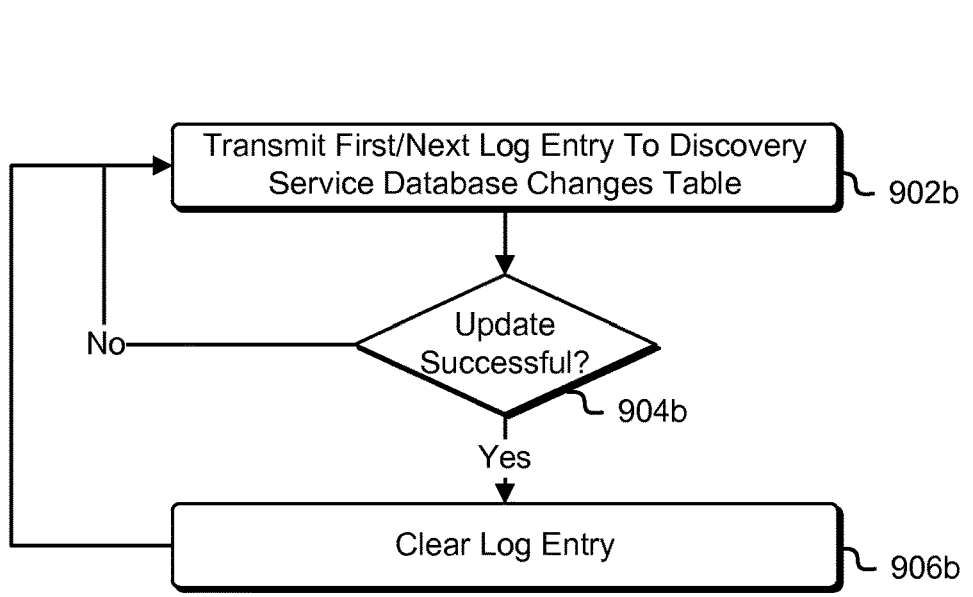
FIG. 9b shows an illustrative example of a process for updating a discovery service database changes table for each log entry comprising zonal tag information for a created zonal tag in accordance with at least one embodiment.

As noted above, a tag manager may be configured to maintain a log including one or more log entries corresponding to one or more zonal tags created and maintained within a particular data zone. These log entries may be used by the tag manager to cause an update of a changes table within a discovery service database in order to support zonal and regional/global queries. Accordingly, FIG. 9b shows an illustrative example of a process 900b for updating a discovery service database changes table for each log entry comprising zonal tag information for a created zonal tag in accordance with at least one embodiment. The process 900b may be performed by a tag manager operating within a data zone in a particular data region configured to transmit one or more appropriately configured API calls to both a tag manager database and a discovery service database.

As noted above, the tag manager, upon receiving a request from a user of the tag manager to create a new zonal tag, may create a log entry within a log which may be used for asynchronous processing. Accordingly, the tag manager may utilize this log to transmit 902b a first log entry to the discovery service database changes table in order to update the changes table. As noted above, the discovery service may comprise a change processor configured to communicate with the discovery service database to obtain changes listed in the changes table within the discovery service database and to update one or more data tables within the discovery services database to reflect these changes and to support the regional/global queries.

In response to transmitting the first log entry to the discovery service database changes table, the tag manager may determine 904b whether the update of the changes table was successful. For instance, if the discovery service database is offline or otherwise unavailable, the tag manager may be unable to update the discovery service database until the discovery service database is made available again. Accordingly, the tag manager may proceed to select the next log entry from the log and again transmit 902b this next log entry to the discovery service database changes table. This may enable the tag manager to continuously attempt to update the discovery service database changes table to include these log entries and, accordingly, synchronize the tag manager database and the discovery service database.

If the tag manager is able to cause the discovery service database changes table to be updated to include the currently selected log entry, the tag manager may edit the log to clear 906b the log entry and, subsequently transmit 902b the next log entry to the discovery service database changes table. The tag manager may be configured to clear each log entry that has been successfully transmitted to the discovery service database changes table in order to prevent duplication of data within this changes table. Further, this may prevent the log from expanding substantially over time, thus potentially preventing additional latency in the process.

Figure 10:
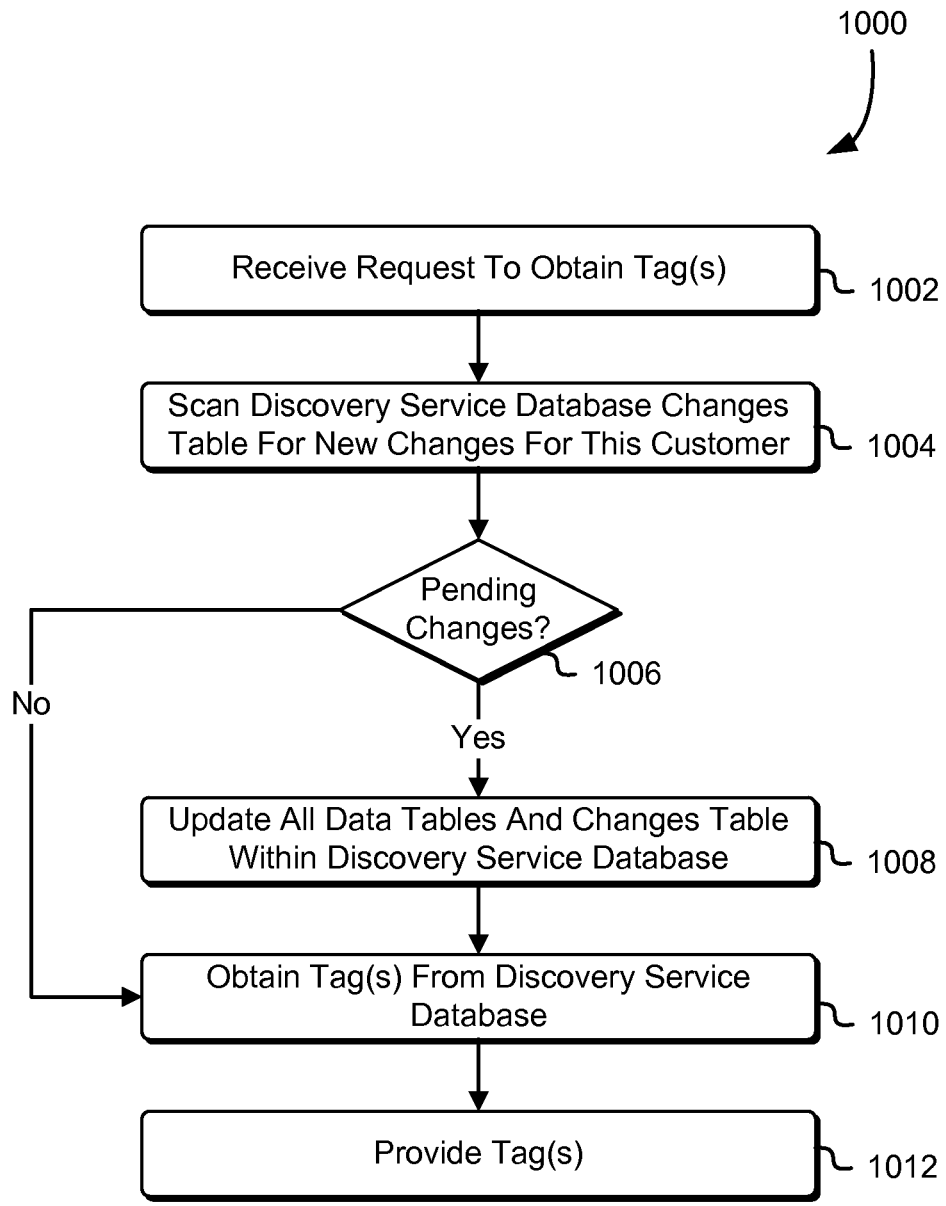
FIG. 10 shows an illustrative example of a process for retrieving one or more tags through a discovery service in accordance with at least one embodiment.

As noted above, the discovery service may be configured to aggregate a plurality of zonal metadata tags within a particular data region in order to support regional and/or global queries. Thus, the discovery service may need to be configured to coordinate with one or more zonal tag managers to contemporaneously obtain a listing of changes made to the metadata tags stored within a region to support these queries. Accordingly, FIG. 10 shows an illustrative example of a process 1000 for retrieving one or more tags through a discovery service in accordance with at least one embodiment. The process 1000 may be performed by a discovery service within a particular data region managed by the computing resource service provider. The discovery service may comprise a plurality of components that may be used to retrieve these one or more tags. For instance, as will be described in greater detail below, the discovery service may comprise a change processor configured to communicate with a discovery service database to obtain changes listed in a changes table within the discovery service database and to update one or more data tables within the discovery services database to reflect these changes and to support the regional/global queries.

A customer of a computing resource service provider may be granted access to one or more services within a particular data region to support his/her business needs. For instance, the customer may utilize a virtual computer system service within a data region to manage and utilize one or more virtual machine instances. Additionally, the customer may utilize a zonal tag manager to generate one or more metadata tags which may be used in conjunction with these virtual machine instances. As the customer's business needs expand, the customer may desire to obtain information regarding all data the customer may have within a particular data region. Accordingly, the customer may utilize a discovery service to submit one or more queries to obtain customer tag information. Thus, the discovery service may initially receive 1002 a request from a customer or other entity (e.g., service or process) to obtain one or more metadata tags within the data region.

Once the discovery service has received a request to obtain the one or more metadata tags within the data region, the discovery service may transmit one or more appropriately configured API calls to a change processor to scan 1004 a changes table within the discovery service database to determine whether there are any new changes to the changes table. As noted above, each zonal tag manager within a particular data region may be configured to update a changes table within the discovery service database to reflect creation and/or deletion of one or more zonal metadata tags within a particular data zone. Accordingly, the changes table may include an aggregation of all changes made to the metadata tags in each of the data zones within the data region.

The change processor within the discovery service may utilize the changes table to determine 1006 whether there are any pending changes to the discovery service database that may need to be incorporated in order to maintain consistency between the discovery service database and each of the zonal tag manager databases within the data region. For instance, if the changes table does include one or more pending changes, the change processor may utilize these pending changes to update 1008 all data tables within the discovery service database to reflect these pending changes and maintain consistency with the zonal tag manager databases. Further, once the data tables within the discovery service database have been updated successfully, the change processor may update the changes table within the discovery service database to remove all processed pending changes. This may prevent duplication of data within the data tables in the discovery service database and maintain consistency with the zonal tag manager databases.

Once all the data tables within the discovery service database have been updated or if the changes table did not include any pending changes, the discovery service may communicate with the discovery service database, such as through one or more appropriately configured API calls to the database, to obtain 1010 the one or more metadata tags from the data tables within the discovery service database necessary to fulfill the regional or global query. The metadata tags obtained from the discovery service database may include the latest set of changes obtained from the changes table and thus may be consistent with the data stored within the zonal tag manager databases. The discovery service may thus provide 1012 these obtained metadata tags to the customer or other entity in order to fulfill the customer's or other entity's request.

Figure 11:
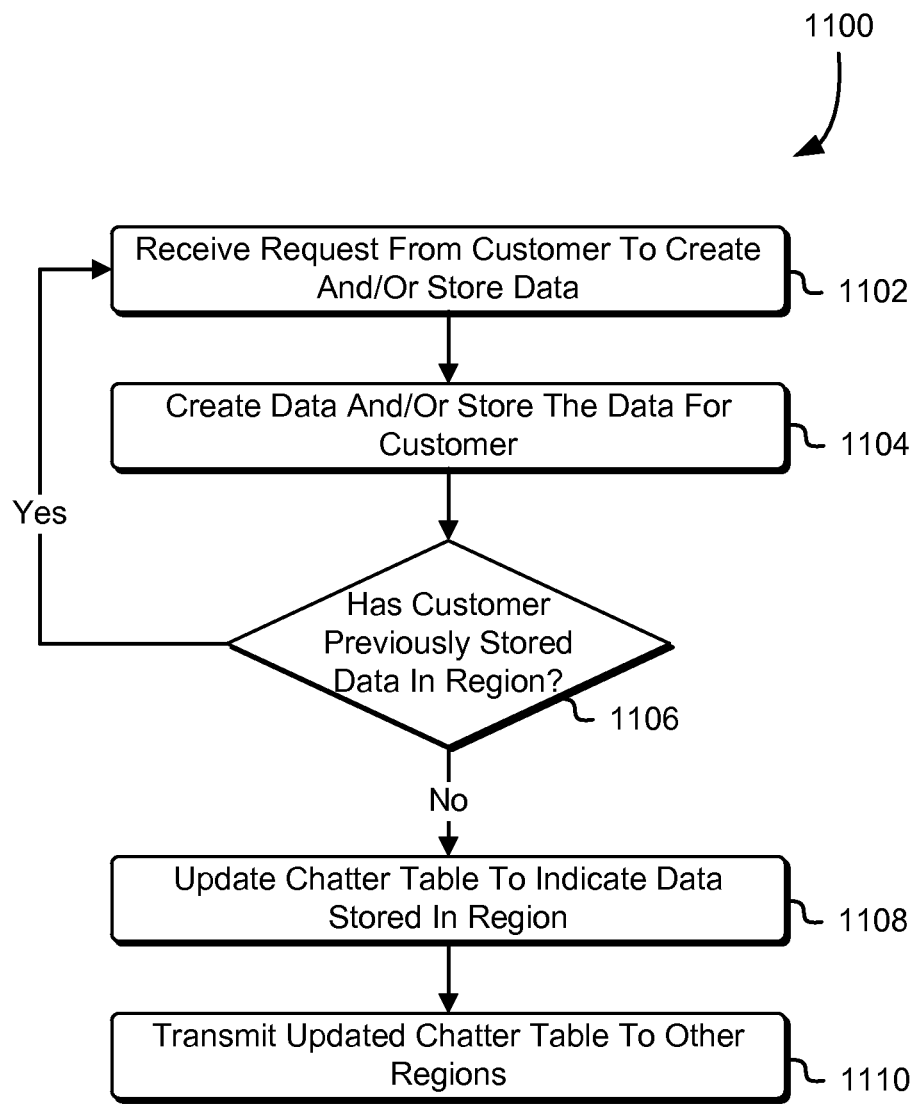
FIG. 11 shows an illustrative example of a process for updating a chatter table for all data regions based at least in part on customer data stored in a data region in accordance with at least one embodiment.

As noted above, each data region may comprise a chatter table, which may include a listing of all customer data within the various data regions managed by a computing resource service provider. Thus, when a customer generates data within any particular data region, the chatter table within this particular may be updated to reflect this generation of data and, subsequently, the other chatter tables in the other data regions may be synchronized to ensure that these chatter tables reflect the generation of data as well. Accordingly, FIG. 11 shows an illustrative example of a process 1100 for updating a chatter table for all data regions based at least in part on customer data stored in a data region in accordance with at least one embodiment. The process 1100 may be performed by various entities. For instance, the process 1100 may be performed by one or more services within a particular data region configured to create, manage and/or store customer data within the particular data region. Further, the process 1100 may be performed in conjunction with a separate service or process within the particular data region configured to interact with the one or more services configured to create, manage and/or store customer data to obtain information necessary to update a chatter table within the particular data region and transmit this updated chatter table to other data regions to maintain consistency among all data regions.

As noted above, a customer of the computing resource service provider may be granted access to one or more services within a data region in order to support his/her business needs. For instance, a customer may utilize a virtual computer system service within a particular data region to request creation and instantiation of one or more virtual machine instances. Additionally, the customer may access a zonal tag manager to request creation of one or more metadata tags usable to flag the one or more virtual machine instances to ease identification of each of the virtual machine instances. Accordingly, a service within the particular data region may receive 1102 a request from a customer to create, store and/or manage data within the particular data region. Based at least in part on the customer request, the service within the particular data zone may create 1104 data and/or store data on behalf of the customer within the particular data region. For instance, the applicable service may be configured to allocate a number of computing resources within the data region to provide persistent storage for the created customer data.

Once the customer data has been created and/or stored within the particular data region, the service used by the customer or, in some embodiments, an additional service or process configured to update and manage a chatter table within the data region, may determine 1106 whether customer data has been previously stored within the particular data region. As noted above, each data region may comprise a chatter table that may include a listing of all customer data stored within the one or more data regions managed by the computing resource service provider. Accordingly, if a customer has not previously stored any data within any of the one or more data regions, the chatter table may not include a listing for the customer. Alternatively, the chatter table may include an identification of the customer but the chatter table may not include any data regions for the customer, as he/she may not have any customer data within any of the one or more data regions.

If the customer has not previously had data stored within the particular data region, the service through which the customer first submitted the request to create and/or store data or some other service as described above may update 1108 the chatter table to indicate that the customer now has customer data stored in the particular data region. For instance, if the customer has not previously created and/or stored any data within any data region, a service may access the chatter table and create a new entry for the customer that may include an identification for the customer (e.g., customer account number, customer user name, customer real name, etc.) and the data region wherein the data has been created and/or stored. In some embodiments, the chatter table can be updated to further include the type of data created and/or stored within the particular data region and other information usable by any service within a data region to locate customer data. In an alternative embodiment, if the customer has previously created and/or stored data in a different data region than the particular data region in which the customer is currently being created and/or stored, a service within the particular region may update 1108 the chatter table to indicate that the customer now has data stored in this particular data region in addition to the prior entry in the chatter table. Thus, updating the chatter table may include writing information about where the data is stored without actually writing the data itself to the chatter table.

Once the chatter table within the particular data region has been updated to indicate that the customer has created and/or stored customer data within this particular data region, the service through which the customer first submitted the request to create and/or store data or some other service as described above may transmit 1110 the updated chatter table to the other data regions managed by the computing resource service provider. Accordingly, a service within each of the other data regions may utilize this updated chatter table to further update the chatter table in each of these other data regions to ensure consistency across all data regions managed by the computing resource service provider.

Figure 12:
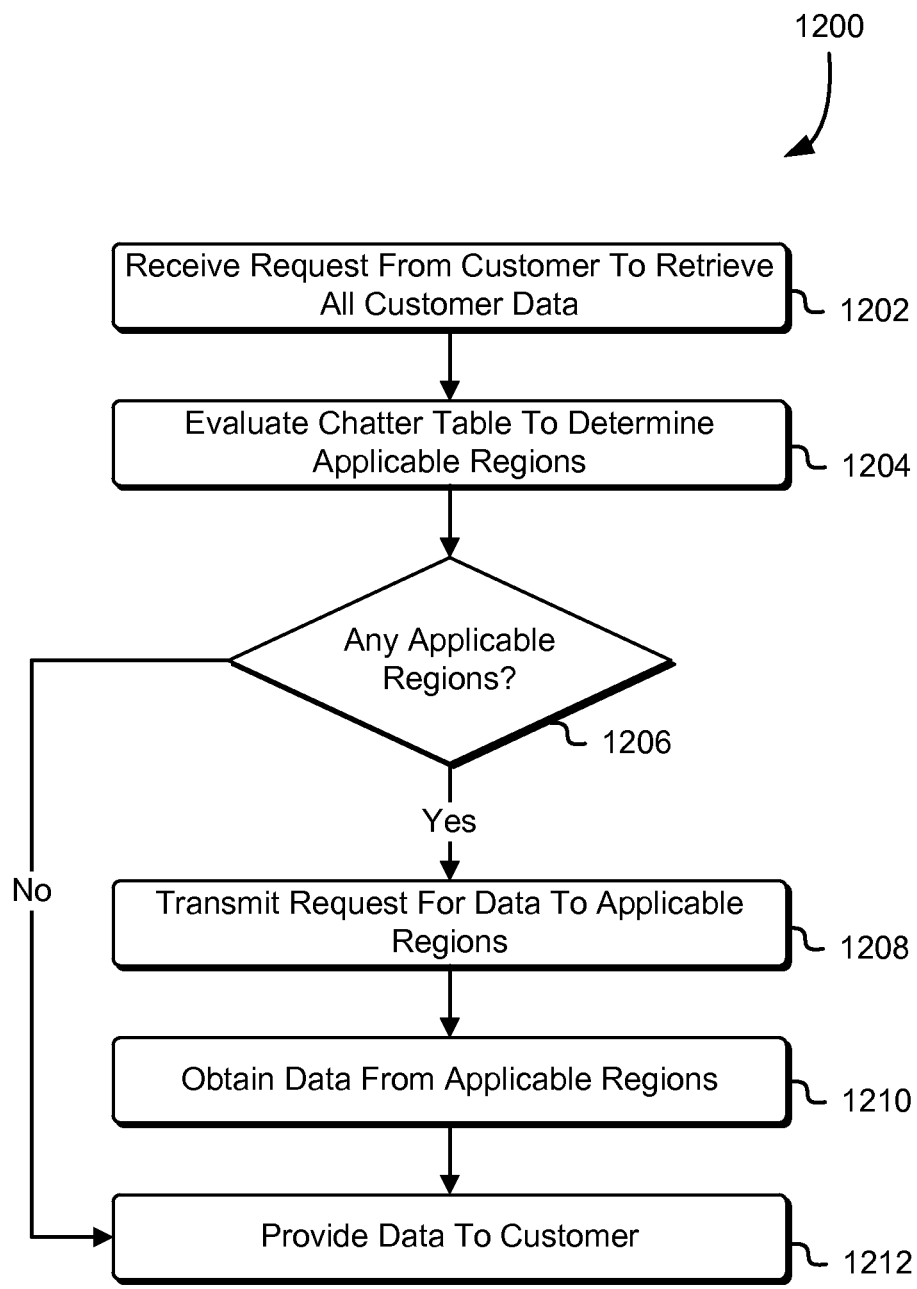
FIG. 12 shows an illustrative example of a process for retrieving customer data from one or more data regions based at least in part on a chatter table in accordance with at least one embodiment.

As noted above, the chatter table may comprise a listing of all customer data across one or more data regions managed by a computing resource service provider. Thus, a customer may, at some point, may want to retrieve this customer data by only communicating with one service within a particular data region, without having to access multiple data regions to obtain his/her customer data. Accordingly, FIG. 12 shows an illustrative example of a process 1200 for retrieving customer data from one or more data regions based at least in part on a chatter table in accordance with at least one embodiment. The process 1200 may be performed by any service within a data region managed by a computing resource service provider, wherein the service is configured to access the chatter table, access other data regions and communicate with one or more services within these other data regions, such as through one or more API calls to these one or more services, to retrieve the customer data.

At any point, a customer of the computing resource service provider may access a particular data region to interact with one or more services within this particular data region provided by the computing resource service provider. For instance, a customer may interact with a discovery service, as described above, to submit a regional and/or global query to obtain information regarding the customer's metadata tags within the data region or across multiple data regions. Accordingly, a service within this particular data region may receive 1202 a request from a customer or other entity (e.g., another service or process) to retrieve all customer data that may be stored throughout the one or more data regions managed by the computing resource service provider. While the present disclosure describes that all customer data may be retrieved, the customer or other entity may submit a regional and/or global query to obtain a subset of data from multiple data regions.

Once the service within this particular data region has received this request, this service may access and evaluate 1204 a chatter table within this particular data region to determine all applicable data regions that may comprise customer data. As noted above, the chatter table may include a listing of locations wherein customer data may be stored. For instance, the chatter table may include one or more columns that include the identification of the customer and the associated data regions wherein customer data may be stored. An illustrative example of a chatter table is included in FIG. 7, although the chatter table may include greater or fewer columns to provide necessary information for locating and obtaining customer data from other data regions. Accordingly, the service within this particular data region may utilize the chatter table to determine 1206 whether there are any applicable data regions that may include customer data.

If the service within this particular data region determines, based at least in part on the listings included in the chatter table, that there are any applicable data regions that may include customer data, the service may access the applicable data regions and transmit 1208, to one or more services within each of these applicable data regions, a request to obtain customer data. For instance, if the customer has requested to receive all relevant metadata tag information through a discovery service within the particular data region, the discovery service may transmit a request to each of the discovery service instances within each of the applicable data regions to obtain the relevant metadata tag information.

Accordingly, each of the one or more services within each of these applicable data regions may locate and prepare the customer data for delivery to the requesting service in the particular data region.

Once each of the one or more services within each of the applicable data regions locates and transmits the customer data, the requesting service within the particular data region may obtain 1210 the relevant customer data. Accordingly, the service within the particular data region may aggregate the obtained customer data and provide 1212 the customer data to the customer in order to fulfill the customer's request or query. Thus, the customer need only submit one request to a service within a particular data region to obtain all customer data across the myriad data regions managed by the computing resource service provider.

Figure 13:
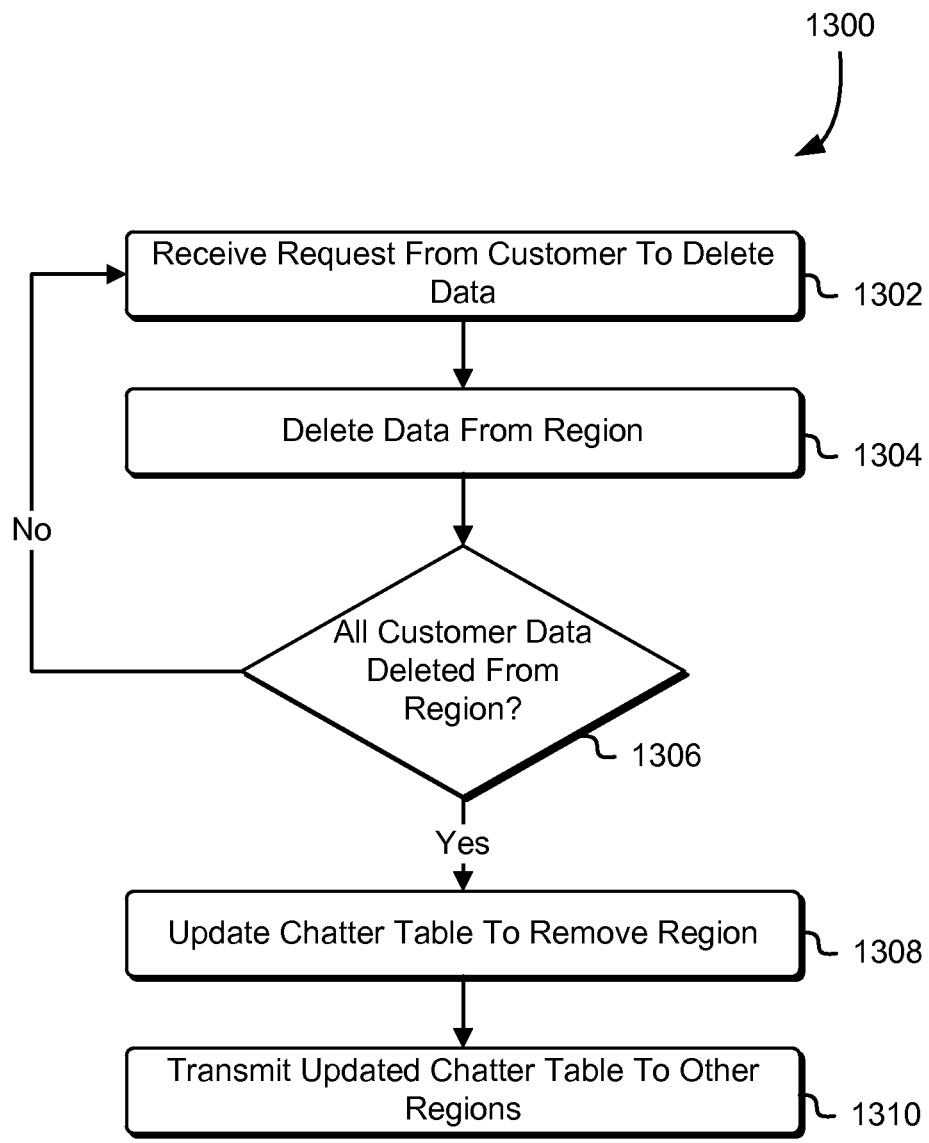
FIG. 13 shows an illustrative example of a process for updating a chatter table for all data regions based at least in part on deletion of customer data in one or more data regions in accordance with at least one embodiment.

In addition to creating customer data within a particular data region, a customer may request that customer data be modified or even deleted within the particular data region. If customer data is deleted, it may be necessary to update the chatter table within the particular data region, as well as in other data regions managed by the computing resource service provider, to indicate that the customer no longer has customer data stored within this particular data region. Accordingly, FIG. 13 shows an illustrative example of a process 1300 for updating a chatter table for all data regions based at least in part on deletion of customer data in one or more data regions in accordance with at least one embodiment. As in the processes described above in connection with FIGS. 11 and 12, the process 1300 may be performed by any service within a data region managed by a computing resource service provider, wherein the service is configured to access the chatter table, access other data regions and communicate with one or more services within these other data regions, such as through one or more API calls to these one or more services, to manage customer data.

As noted above, a customer of the computing resource service provider may access a particular data region in order to utilize one or more services provided by the computing resource service provider to support his/her business needs. Accordingly, the customer may utilize a service within this particular data region to request deletion of customer data within the particular data region. For instance, the customer may request deletion of one or more customer files persistently stored within a logical data container in the particular data region. In another instance, the customer may request deletion of one or more metadata tags within the particular data region that are obsolete or otherwise no longer necessary to support other customer data within the particular data region (e.g., virtual machine instances, logical data containers, etc.). Thus, the service utilized by the customer may receive 1302 a request from the customer to delete customer data.

Once the service utilized by the customer has received the request from the customer to delete the customer data, the service may proceed and delete 1304 the specified customer data from the particular data region. Further, the service utilized by the customer may be configured to determine 1306 whether all customer data has been deleted from the particular data region. For instance, if the customer has specified that only his/her metadata tags are to be deleted from the data region, the data region may still comprise other customer data. Accordingly, if the data region still comprises customer data, the service utilized by the customer may continue to process other customer requests.

If all of the customer's data has been deleted from the data region as a result of the customer's request, the service utilized by the customer may access the chatter table within the particular data region and update 1308 the chatter table to remove the particular data region from the customer's entry in the chatter table. For instance, as illustrated in FIG. 7, the chatter table may include a number of columns that include a listing of the identification of each customer of the computing resource service provider that has customer data stored in at least one data region managed by the computing resource service provider. Additionally, the chatter table may include a number of columns that include a listing of the one or more data regions wherein each customer may have customer data stored. Thus, the service utilized by the customer may delete the particular data region from the appropriate column within the chatter table or delete the entire customer entry in the chatter table if the customer no longer has any data stored within any of the data regions managed by the computing resource service provider.

Once the chatter table has been updated to remove the particular data region from the customer entry within the chatter table or the customer entry has been removed entirely, the service utilized by the customer may access the other data regions managed by the computing resource service provider and transmit 1310 the updated chatter table to these other data regions. Accordingly, the chatter table in each of these other data regions may now be updated, based at least in part on the updated chatter table recently modified within the particular data region, to reflect the deletion of the customer data within the particular data region.

Figure 14:
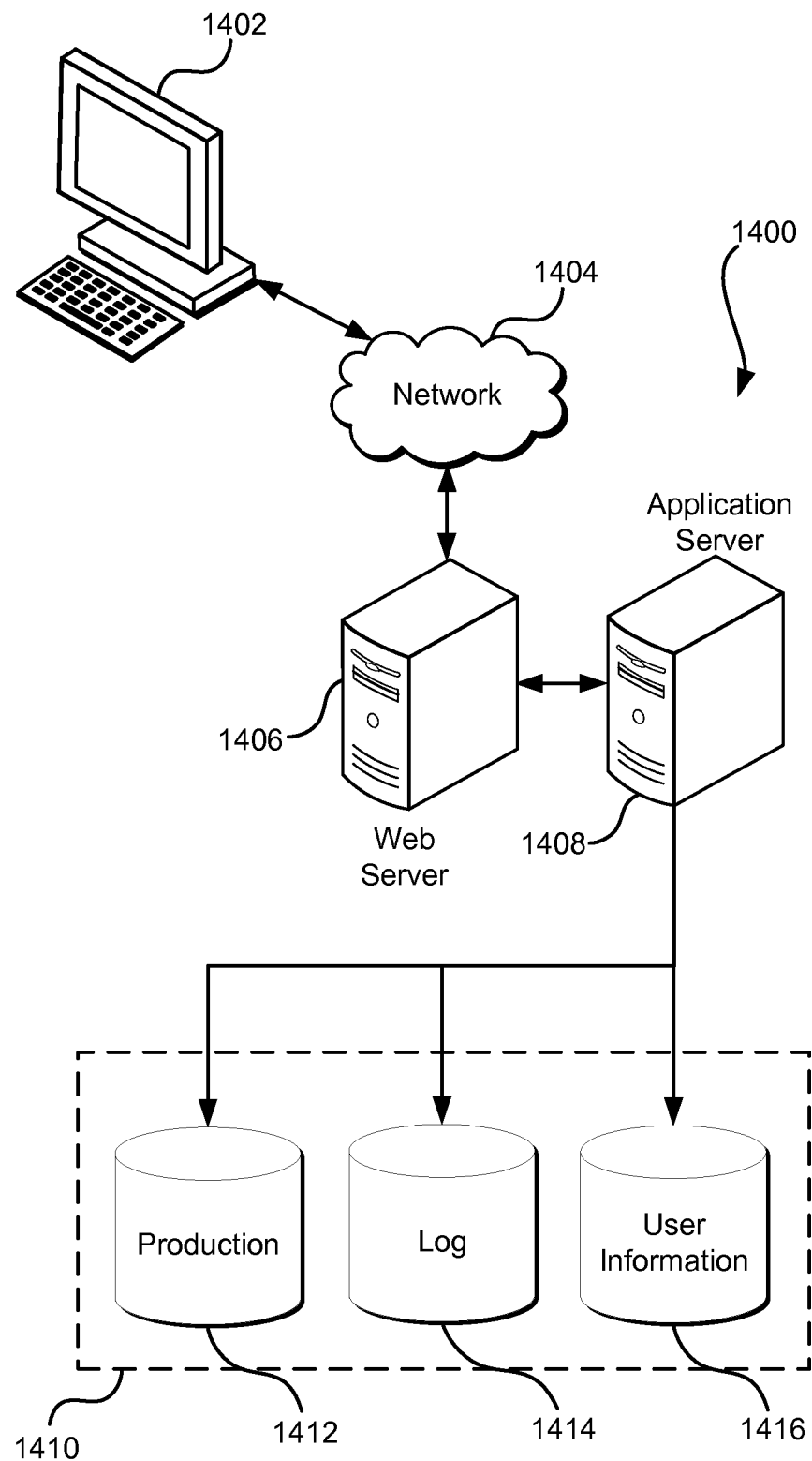
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   transmitting, from a first location to a second location, an update to a first data structure of the second location that indicates a first set of locations where subsets of data are stored to indicate that a first subset of the data is stored at the first location;
   receiving, at the first location, a request to obtain the data;
   determining, based at least in part on a second data structure of the first location that indicates a second set of locations where the subsets of the data are stored, that the second location stores a second subset of the data by at least locating a customer identification value within the second data structure to identify one or more identifiers for the second location that indicate locations of subsets of the data;
   obtaining aggregated data by at least:
      receiving, from the second location, the second subset of the data; and
      aggregating the second subset of the data with the first subset of the data; and
   transmitting the aggregated data in response to the request.

2. The computer-implemented method of claim 1, wherein the first location comprises a plurality of computing devices that implement one or more services that access the second data structure to fulfill the request.

3. The computer-implemented method of claim 1, wherein the second location comprises a plurality of computing devices that implement one or more services that:
   obtain the second subset of the data in response to the request; and
   transmit the second subset of the data.

4. The computer-implemented method of claim 1, further comprising maintaining the first data structure and the second data structure to be consistent across the first and second locations.

5. The computer-implemented method of claim 4, wherein maintaining the first data structure to be consistent includes transmitting, from the second location to the first location, an additional update to the second data structure of the first location.

6. The computer-implemented method of claim 1, wherein obtaining the aggregated data is performed without requesting data from at least one location as a result of the at least one location lacking data associated with the request.

7. A computer system, comprising:
   one or more processors; and
   memory storing instructions that, if executed by the computer system, cause the computer system to:
      store, at a first location, first data;
      transmit, from the first location to a second location, an update to a first data structure associated with the second location to cause the first data structure to indicate the first data is stored at the first location;
      receive a notification from the second location that second data is stored at the second location;
      update a second data structure associated with the first location to indicate that the second location stores the second data, the first and second data structures comprising:
         a plurality of identifiers for a plurality of locations that store data associated with a plurality of users of the computer system; and
         a plurality of user identification values usable to obtain the plurality of identifiers for the plurality of locations that store the data associated with the plurality of users of the computer system; and
      in response to a request for data, receive, a result of the second data structure associated with the first location indicating that the second location stores the second data, the second data from the second location and aggregating the second data with at least the first data.

8. The computer system of claim 7, wherein the data structure associated with the first location further comprises an identifier associated with a user of the computer system for the first location.

9. The computer system of claim 7, wherein the first location and the second location further each comprise a plurality of computing devices that implement one or more services that obtain data associated with a user in response to the request from the user to locate the data associated with the user across multiple locations.

10. The computer system of claim 7, wherein the computer system is able to access, on behalf of a user, the first location and the second location to generate, manage, and obtain the data.

11. The computer system of claim 7, wherein the first data structure associated with the second location is accessible to locate data associated with a user across the first and the second locations regardless of whether the second location comprises the data associated with the user.

12. The computer system of claim 7, wherein the instructions, further in response to the request for data, cause the computer system to: submit an additional request to the second location for the second data; and receive the second data in response to the additional request.

13. The computer system of claim 12, wherein the additional request in an application programming interface call.

14. A non-transitory computer-readable storage medium storing instructions that, if executed by one or more processors of a computer system, cause the computer system to at least:
transmit, from a first location to a second location, an update to a first data structure of the second location that indicates a first set of locations where subsets of data are stored to indicate that a first subset of the data is stored at the first location;
receive, at the first location, a request for the data;
identify, based at least in part on a second data structure of the first location that indicates a second set of locations where the subsets of the data are stored, other locations that store a second subset of the data by at least causing the computer system to locate a user identification value within the second data structure to obtain one or more identifiers for the other locations;
transmit, to each location of the other locations that store the second subset of the data, a request to obtain at least a portion of the second subset of the data; and
in response to receipt of the second subset of the data, transmit the first subset of the data and the second subset of the data.

15. The non-transitory computer-readable storage medium of claim 14, wherein the instructions further cause the computer system to aggregate the first subset of the data and the second subset of the data such that the data is provided to fulfill the request.

16. The non-transitory computer-readable storage medium of claim 14, wherein the first data structure and the second data structure are maintained to be consistent across the first location and the second location.

17. The non-transitory computer-readable storage medium of claim 14, wherein receiving the second subset of the data is performed without requesting data from at least one location other than the other locations as a result of the at least one location lacking another portion of the second subset of the data.

18. The non-transitory computer-readable storage medium of claim 14, wherein each location of the other locations comprises a plurality of computing devices that implement one or more services that obtain portions of the second subset of the data in response to the transmitted request and to transmit the portions of the second subset of the data.

19. The non-transitory computer-readable storage medium of claim 14, wherein the instructions further cause the computer system to access the first location to access the second data structure to fulfill the request.

20. The non-transitory computer-readable storage medium of claim 14, wherein the instructions that cause the computer system to receive the second subset of the data further cause the computer system to, from each location of the other locations: receive the portion requested from the location; and aggregate the portion with other portions from the other location to produce the second subset of the data.

* * * * *